(12) United States Patent
Cheng et al.

(10) Patent No.: US 10,298,679 B1
(45) Date of Patent: May 21, 2019

(54) OBJECT OWNERSHIP MIGRATION

(71) Applicant: Amazon Technologies, Inc., Seattle, WA (US)

(72) Inventors: Pablo Puo Hen Cheng, Pomona, CA (US); Rosen Ognyanov Baklov, Lake Forest, CA (US); Jesse Aaron Van Beurden, Irvine, CA (US); Igor Gorelik, Irvine, CA (US)

(73) Assignee: Amazon Technologies, Inc., Seattle, WA (US)

( * ) Notice: Subject to any disclaimer, the term of this patent is extended or adjusted under 35 U.S.C. 154(b) by 630 days.

(21) Appl. No.: 14/859,140

(22) Filed: Sep. 18, 2015

(51) Int. Cl.
*G06F 15/16* (2006.01)
*H04L 29/08* (2006.01)

(52) U.S. Cl.
CPC .......... *H04L 67/1095* (2013.01); *H04L 67/32* (2013.01)

(58) Field of Classification Search
CPC ... H04L 67/42; H04L 63/083; H04L 65/4084; H04L 63/101; H04L 67/1097; H04L 65/60; H04L 67/2842; H04L 12/1818; G06F 21/6218; G06F 12/0813; G06F 12/0815; G06F 12/0866; G06F 17/30132; G06F 17/30194
See application file for complete search history.

(56) References Cited

U.S. PATENT DOCUMENTS

| | | | |
|---|---|---|---|
| 8,271,651 B1 | 9/2012 | Wang et al. | |
| 9,229,657 B1 | 1/2016 | Rus et al. | |
| 9,501,915 B1 | 11/2016 | Laska et al. | |
| 2002/0095403 A1* | 7/2002 | Chandrasekaran | G06F 12/0804 |
| 2002/0095454 A1 | 7/2002 | Reed et al. | |
| 2003/0115434 A1* | 6/2003 | Mahalingam | G06F 17/30067 711/165 |
| 2003/0177187 A1 | 9/2003 | Levine et al. | |
| 2004/0103182 A1 | 5/2004 | Krabel et al. | |
| 2004/0117345 A1* | 6/2004 | Bamford | G06F 17/3038 |
| 2004/0117377 A1 | 6/2004 | Moser et al. | |
| 2005/0038849 A1* | 2/2005 | Kaluskar | G06F 17/30575 709/203 |
| 2005/0060275 A1 | 3/2005 | Steuernagel et al. | |

(Continued)

*Primary Examiner* — Michael A Keller
*Assistant Examiner* — Thao D Duong
(74) *Attorney, Agent, or Firm* — Baker & Hostetler LLP

(57) ABSTRACT

A computing system is disclosed for reassigning ownership of a data object between computing nodes. A first computing node having control of a data object transmits a hand-off message indicating control of the data object is being transferred to a second computing node. The first computing node queues requests received at the first computing node relating to the data item. A third computing node that interacts with the data object receives the hand-off message and, in response, delays transmitting requests relating to the data object. The third computing node transmits an acknowledgment to the first computing node. Upon receipt of the acknowledgment, the first computing node communicates to the second computing node to assume ownership and transmits any requests that had queued at the first node. When the second computing node receives the message, it transmits a message claiming control of the data object. In response to the message claiming control, the third computing node transmits its queued requests relating to the data item to the second computing node.

20 Claims, 10 Drawing Sheets

(56) References Cited

U.S. PATENT DOCUMENTS

| | | |
|---|---|---|
| 2005/0278731 A1 | 12/2005 | Cameron et al. |
| 2006/0069702 A1 | 3/2006 | Moeller et al. |
| 2006/0129513 A1* | 6/2006 | Nakatani ............... G06F 3/0605 |
| 2006/0149516 A1 | 7/2006 | Bond et al. |
| 2006/0265554 A1 | 11/2006 | Carter et al. |
| 2007/0097959 A1 | 5/2007 | Taylor |
| 2007/0149216 A1 | 6/2007 | Misikangas |
| 2008/0033812 A1 | 2/2008 | McKenna et al. |
| 2008/0168390 A1 | 7/2008 | Benyamin |
| 2008/0201461 A1* | 8/2008 | Yoshiuchi ............... H04L 29/06 709/223 |
| 2009/0254601 A1 | 10/2009 | Moeller et al. |
| 2010/0235409 A1 | 9/2010 | Roy et al. |
| 2011/0055210 A1 | 3/2011 | Meredith et al. |
| 2011/0126131 A1 | 5/2011 | Baszucki |
| 2011/0136571 A1* | 6/2011 | Ito ......................... A63F 13/803 463/30 |
| 2011/0161451 A1 | 6/2011 | Hum et al. |
| 2011/0191628 A1 | 8/2011 | Noguchi et al. |
| 2012/0254279 A1* | 10/2012 | Peterson ............... G06F 9/5055 709/201 |
| 2013/0044106 A1 | 2/2013 | Shuster et al. |
| 2013/0121263 A1 | 5/2013 | Nguyen et al. |
| 2013/0283146 A1 | 10/2013 | Barak et al. |
| 2013/0346572 A1 | 12/2013 | Jain et al. |
| 2014/0228115 A1 | 8/2014 | Kaplan |
| 2014/0359230 A1 | 12/2014 | Arora et al. |
| 2015/0382059 A1 | 12/2015 | Mano |

* cited by examiner

OBJECT OWNERSHIP MIGRATION

BACKGROUND

In a network environment comprising a plurality of computing nodes, data objects are often distributed amongst nodes in the network. In embodiments wherein multiple nodes frequently access the same data object, the particular data object may be copied onto or replicated on multiple nodes in the network so as to minimize having to traverse the network in order to access the particular data object. In such replication environments, one of the nodes is typically understood to own or control modifications to the particular data object. When a computing node needs to modify a particular data object in some manner, a request is communicated to the owner or master node which controls modification to the particular data object. The owner or master node that controls the data object processes the request and communicates any responsive information across the network for receipt at the requesting node.

BRIEF DESCRIPTION OF DRAWINGS

The following description of the illustrative embodiments may be better understood when read in conjunction with the appended drawings. It is understood that potential embodiments of the disclosed systems and methods are not limited to those depicted.

DETAILED DESCRIPTION

Figure 1A:
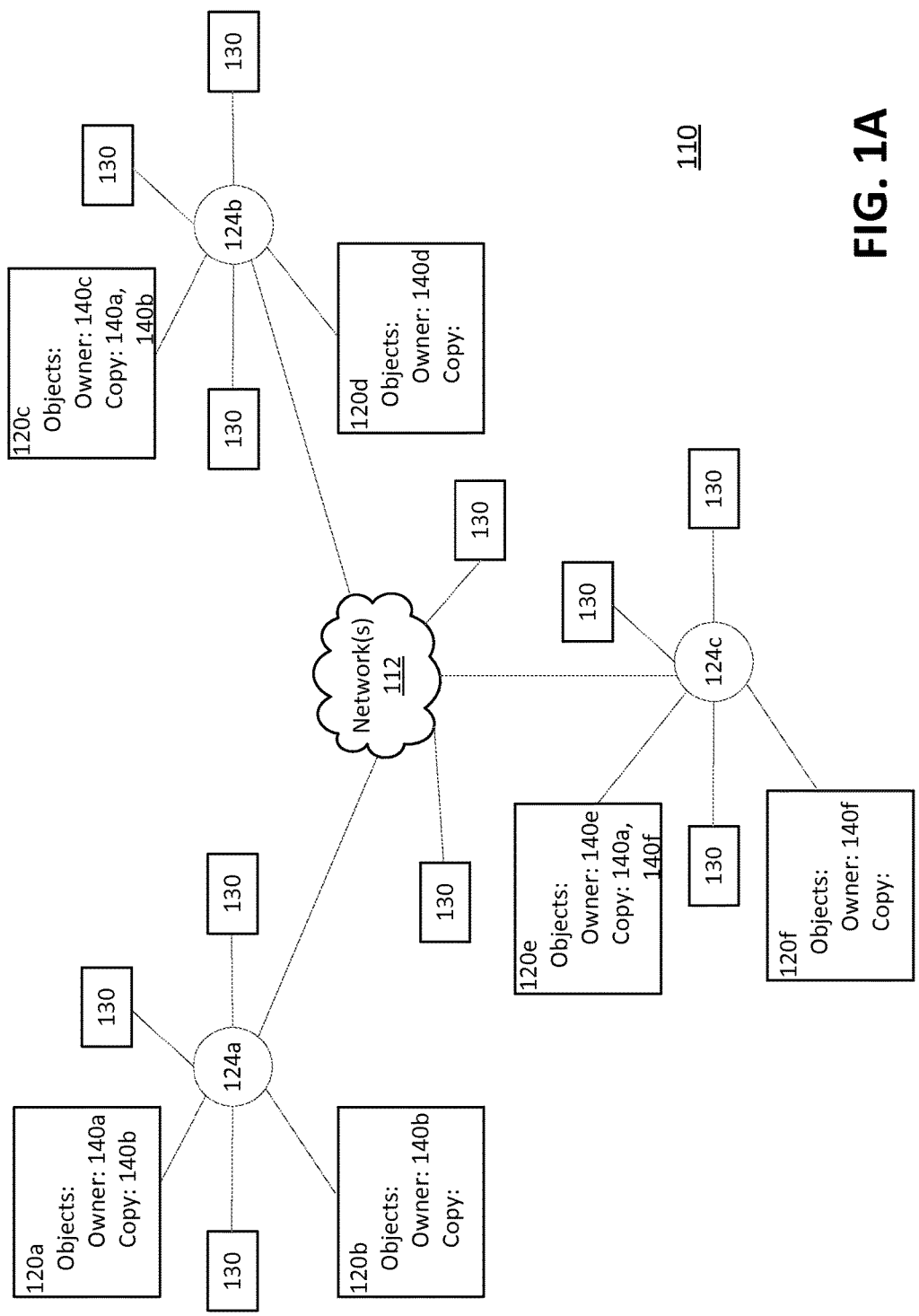
FIG. 1A depicts an example computing network.

In a network environment where data objects are replicated amongst computing nodes, the particular computing system or node which controls access to the particular data item, and/or which has authority to modify the data object may be referred to by any number of suitable terms including, for example, the data object owner node or data object master node. A data object owner node is programmed to receive requests to read and/or modify the particular data object from other nodes on the network. Where numerous nodes request access to the data object, the data object owner node is typically programmed to queue and prioritize the requests.

In some instances, a data object owner node may unexpectedly cease operating as anticipated. In other words, the data object owner node may fail. For example, the data object owner node may lose access to resources such as power or memory, or become overburdened and cease to be able to process requests. In a scenario wherein a data object owner ceases expected operation, ownership of the object may be transferred or migrated to another computing node on the network. For example, computing nodes in the network that rely upon the data object owner for access to the data object may detect that the data object owner has ceased operating as anticipated and promote another computing node to become the owner of the particular data object In an example scenario, the process of detecting and assigning a new computing node as owner of a particular object, a process sometimes referred to as fault-tolerance processing, may involve promoting to object owner the first node that detects the existing object owner node has failed.

In the scenario wherein a data object owner node fails and another computing node takes over operation of the computing node, there is limited opportunity for conflicts to develop as to the current data object owner. At any given time, there is only one computing node designated as the object owner adapted to service requests for the particular data object.

Applicants have noted that it may be useful in some instances to transfer object ownership from one network computing system or node to another node and to have the first or original data object owner node continue operating after the transfer of ownership. For example, in some network embodiments, a data object owner computing node may receive numerous requests from one particular computing node relating to a particular data object. In an example scenario, the data object owner node may be geographically remote from the node that is primarily forwarding requests for the particular data object. In such a scenario, it may be more efficient and conserve network bandwidth to reassign or migrate ownership of the particular object to the computing system that more frequently interacts with the particular data object.

Applicants have noted that transferring ownership of a data object between computing nodes may be complicated by the inherent characteristics of networks. For example, it is frequently the situation that the same message communicated simultaneously to two different nodes may arrive at the two nodes at different times. In the context of object owner reassignment or migration, a message or instruction to reassign or migrate ownership from a first network node to a second network node may be received at different times by different nodes on the network. Because a message regarding a reassignment or migration of object ownership may be received at different times by different nodes in a network, there may be periods where different nodes have information identifying different owners for a the same data object. During periods when different nodes have information identifying different object owners, the nodes may forward requests relating to the same data object to different computing nodes.

Applicants disclose herein systems and method for migrating ownership or control from a first or current data object owner node to a second data object owner. The disclosed systems and methods control the migration so as to avoid different network nodes having information identifying different data object owners for a single data object.

In an example network environment, a plurality of computing systems or nodes may be communicatively coupled in a peer to peer network. In an example scenario, the network of nodes may be adapted to provide support for on-line gaming with some of the computing nodes being adapted to provide, for example, simulation functionality. One of the computing systems nodes, which may be referred to as the data object owner node, may have control of the data object including, for example, authority to modify a particular data object. When computing systems or nodes in the network require, for example, to read or modify the particular data object, the computing nodes transmit requests which are communicated across the network of nodes to the data object owner node. The data object owner computing node processes the requests by taking the appropriate action with respect to the relevant data object. For example, in response to a particular request, the data object owner node may modify the data object and/or retrieve the existing value of the data object and transmit corresponding responsive information across the network of nodes to the requesting node.

As an example, in a virtual environment, such as in a large multi-player game, the virtual environment or world may be hosted, created, and processed by a large number of computing nodes in communication with each other. These computing nodes may be responsible for simulating the many people, places, and things that exist in the virtual environment. Data objects are created and maintained on the computing nodes in order to store and process information relating to the people, places, and things in the virtual environment. For example, a particular data object stored in the system may comprise information about a particular player or person in the virtual world. Another data object may comprise data regarding a particular thing such as, for example, a building, a book, an armament, building, room, etc., that may exist in the virtual world. As actions are taken relative to people and things in the virtual world, the computing nodes process the actions and update the value of data objects that correspond to people or things in the virtual. In an example scenario, where a user throws a ball in the virtual world, a computing node that is responsible for the particular data object that corresponds to the ball in the virtual world, updates the data object to show the impact of the force on the ball. For example, the location of the data object in the virtual world may be changed.

In the context of an example virtual game world, the movement of people and things is dynamic. For example, a person or player in a virtual world may move from one virtual room to another, or from one virtual country to another. The person or player may take virtual things with them such as, for example, an armament or automobile. As these changes take place in the virtual world, corresponding changes are made to the corresponding data objects on the computing nodes. Such changes are sometimes the impetus for ownership or control of data objects to be moved to another computing nodes in the system. For example, where a person in the virtual world has moved to another room, it may increase the efficiency of the system if ownership of the data object that represents the particular person be transferred to a computing node on which the data object for the room exists. By way of further example, where a projectile flies across the world to another country, it may increase efficiency of the system if ownership or control of the data object that represents the projectile be transferred to the computing node having data objects relating to the new location of the projectile.

In a first example process for reassigning or migrating ownership of a data object, a hand-off message is communicated by the current object owner to initiate the handover, and a claim message is communicated by new owner to confirm the handover. In such a hand-off/claim message processing embodiment, once it has been determined that data object ownership is to be migrated or reassigned to a different computing node, the existing or current data object owner system or node generates and communicates a hand-off message indicating that control of the particular data object is being handed off or transferred to a second computing system. The message may have any suitable format and may comprise, for example, information identifying the current object owner system and the second computing system to which control or ownership is being transmitted. The message is communicated over the network to those nodes that interact with the data object for which ownership or control is being transferred or reassigned. For example, the message is transmitted to those computing systems or nodes that have received updates regarding the particular data object or have requested to make changes to the data object.

In addition to communicating a message notifying nodes of the data object ownership hand-off, the current or first data object owner discontinues processing requests relating to the particular data object. For example, the current or first data object owner stops performing any processing related to forwarding information related to the particular data object to other nodes in the network. Additionally, the current or first data object owner node halts processing requests that are received at the first data object owner relating to the particular data object. In an example embodiment, once the first data object owner determines that ownership of the object is being reassigned, and continuing after the first data object owner transmits the hand off message, the first data object owner records requests that are received relating to the data object. In an example scenario, the first data object owner stores the received requests in a queue where the requests are recorded for later forwarding to the new data object owner.

The hand-off message indicating ownership or control of the data object is being transferred is received over the network at each of the plurality of computing systems or nodes that interact with the particular data object. In response to receiving the hand-off message, each of the computing systems or nodes halts transmitting of requests relating to the data object. Additionally, each of the computing nodes that receives the hand-off message identifies and stores for reference that a transfer of control of the data object is pending. In an example scenario, the computing nodes may identify that the particular data object is in a pending-transfer state. For example, each of the computing nodes may note with an entry in a queue maintained for data objects being reassigned that the particular data object is being reassigned.

The hand-off message generated and transmitted by the first data object owner node is also received at the second computing system or node to which ownership is being transferred. In response to receiving the message indicating control of the data object is being transferred to the second computing system, the second computing system assumes control of the data object and transmits a claim message indicating the second computing system has assumed or claimed control or ownership. In an example scenario, the second computing system may store in some manner, such as by marking a data flag relating to the particular data object to indicate that it (the second computing system) is the owner or controller of the object. The message claiming ownership of the data object is transmitted via the network of nodes to systems or nodes that interact with the data object.

The claim message is received at each of the plurality of computing systems or nodes that interact with the data object. In response to the claim message, each of the computing systems or nodes identifies and stores for reference that a transfer of control to the second computing system has taken place and that the data object is no longer in the pending-transfer state. In an example scenario wherein the computing nodes maintain a queue for data objects that are being reassigned, the computing node may remove the particular data object from the queue. Additionally, in response to the message indicating the data object has been claimed, each of the computing nodes resume transmitting of requests relating to the data object. Accordingly, any requests that a particular computing node may have queued while the data object was in the pending-transfer state are transmitted for processing. The newly transmitted requests are communicated over the network of nodes to the new owner, the second computing system.

The message claiming control of the data object is also received at the first computing system which is the original object owner. In response to the message indicating the second computing system has assumed control of the data object, the first computing system transmits to the second computing system requests relating to the data item that had been received by the first computing system after transmitting the hand-off message. The requests are transmitted over the network of nodes to the second computing system.

At the second computing system, requests relating to the data object are received from the plurality of computing systems that interact with the data object. Likewise, the requests relating to the data object that had been queued at the first computing system are received. The requests received from the first computing system comprise requests received by the first computing system after it transmitted the hand-off message indicating control of the data object was to be transferred to a second computing system.

The second computing system, which is the new data object owner or controller, may process the received requests for the data object in any suitable manner. In an example scenario, the second computing system may process the requests as soon as they are received and regardless of the source of the request. For example, requests received from the individual computing nodes, if received prior to the requests received from the original object owner, may be processed before the request that are received from the first data object owner. In this scenario, requests that were received and queued at the first data object owner may ultimately be processed by the second computing system after requests that originated at a later time from the plurality of computing nodes. Processing of requests out of order from how they were originally transmitted may be acceptable in some scenarios. For example, where the object represents a simple counter of the number of hits on a target during a virtual game, it may not matter what order the requests to increment the counter are received, but only that they all are eventually received.

Applicant also discloses example processes for migrating ownership of data objects that preserve the original order of requests. According to one aspect of the disclosed processes, requests relating to the particular data object are suspended at both the existing owner and the nodes that have an interest in the data object. In an embodiment, the existing or current data object owner system or node, generates and communicates a message for computing system nodes that interact with the particular object to suspend or halt transmitting requests relating to the particular data object. The message may indicate that the request to suspend is in connection with a process of migrating or reassigning ownership of the data object. The message may have any suitable format and may comprise, for example, information identifying the current object owner system and the second computing system to which control or ownership is being transmitted. The message is communicated over the network to those nodes that interact with the data object for which ownership or control is being transferred or reassigned.

In addition to communicating a request that interested nodes suspend activity relating to the data object, the current or first data object owner discontinues or suspends processing requests relating to the particular data object. For example, the current or first data object owner ceases performing any processing related to forwarding information related to the particular data object. Additionally, the current or first data object owner node halts processing requests received at the first data object owner relating to the particular data object. In an example embodiment, once the first data object owner determines that ownership of the object is being reassigned, and continuing after the first data object owner transmits the message indicating to suspend forwarding requests, the first data object owner records requests relating to the data item received in a queue.

The message requesting to suspend activity relating to the data object is received over the network at each of the plurality of computing systems or nodes that interact with the particular data object. In response to receiving the message, each of the computing systems or nodes halts transmitting of requests relating to the data object. Additionally, each of the computing nodes that receives the suspend message may internally identify or record that a transfer of control of the data object is pending. In an example scenario, each of the computing nodes may identify with an entry in a queue maintained for data objects being reassigned that the particular data object is being reassigned. After completing their processing in response to the suspend message, each of the plurality of computing systems or nodes that received the suspend message generates and transmits an acknowledgment to the first data object owner node.

The first data object owner node confirms receipt of the acknowledgement from each of the plurality of computing systems. The first data object owner monitors the acknowledgements and identifies when acknowledgments have been received from each of the plurality of computing nodes to which the message to suspend was transmitted.

Once the first data object owner confirms that acknowledgements have been received from all nodes, the first data object owner node generates and transmits a message to a second computing system, i.e., the new data object owner, directing the second computing system to take control of, or authority for, modifying the particular data object. Additionally, the first computing node, i.e., the original object owner, transmits the requests relating to the data object that have been queued at the first computing node during the period processing at the first node has been suspended.

The message transmitted by the first data object owner node is received at the second computing node to which ownership is being transferred. In response to receiving the message, the second computing system assumes control of the data object and transmits a message indicating the second computing system has assumed control or ownership. Additionally, the second computing node, i.e., the new object owner, at this point in the process has the requests that were originally received and queued at the first object owner. The second computing node may process the requests beginning immediately.

The message from the new object owner claiming control of the data object is received at each of the plurality of computing nodes that interact with the data object. In response to the message indicating the second computing system has control of the data object, each of the computing systems or nodes identifies that a transfer of control to the second computing system has taken place and that the data object is no longer in the pending-transfer state. Each of the computing nodes resumes transmitting requests relating to the data object. Accordingly, any requests that a particular computing node may have queued while the data object was in the pending-transfer state are transmitted for processing. The newly transmitted requests are communicated over the network of nodes to the new owner, the second computing system.

The message from the new object owner claiming control of the data object is also received at the first computing node which is the original object owner. In response to the message indicating the second computing system has assumed control of the data object, the first computing system transmits to the second computing system, i.e. the new object owner, a message indicating the migration or reassignment of control of the data object is complete.

The migration complete message is received at the second computing system, i.e., the new object owner. Also, requests relating to the data object are received at the new object owner from the plurality of computing systems that interact with the data object. The new object owner may process the received requests in any suitable manner.

It will be appreciated, that this second example process for migrating object ownership preserves the order of the requests for the data objects. In particular, the requests received at and queued by the first object owner are received at the second object owner before the requests from the various nodes that interact with the particular data object. The second object owner may process the requests in any suitable manner and has the option of processing the requests in the order received which is likely consistent with the order the requests were originally generated. Processing of requests in the order that they were originally transmitted may be preferable or even required in some scenarios. For example, where a data object represents a ball in a virtual game of basketball, the movement of the ball in the virtual game and the result of the game itself is dictated by the order of the request to apply force to the ball by the various players in the virtual game. In such an instance, the requests to apply forces to the data object that represents the ball should be processed in the order that they were generated.

Example Computing Network

FIG. 1A is a diagram illustrating an example computing network 110 in which ownership or authority to modify a data object may be migrated or reassigned from one computing system or node to another computing node. It will be appreciated that computing network 110 may be employed in support of providing any suitable on-line service of functionality. For example, network 110 may be adapted to provide processing for on-line gaming. In such a scenario, requests from client devices may be processed by nodes on network 110 in order to provide simulation in support of an on-line game.

As shown in FIG. 1A, a plurality of computing systems 120a-f are communicatively coupled in any suitable manner to hub computing systems 124a-c. Computing systems 120a-f may be programmed to provide processing relating to an on-line or cloud service. In an example embodiment, computing systems 120a-f may be programmed to operate as simulation servers as part of an on-line gaming service. In an example scenario, computing systems 120a-f may be programmed to perform physics calculations and simulate physical interactions between objects. Computing systems 120a-f may comprise any suitable combination of hardware and software. In an example scenario, computing systems 120a-f may be implemented using virtual servers in a web services computing environment.

Client computing systems 130 are likewise communicatively coupled to hub computing systems 124a-c and are programmed to access services and data provided by network 110 and, in particular, by computing systems 120a-f. In an example embodiment wherein computing systems 120a-f are programmed to operate as simulation servers as part of an on-line gaming service, client computing systems 130 may be programmed to access data objects and processing provided by computing systems 120a-f. More particularly, client computing systems 130 may be used to play on-line games, the processing for which is provided by computing systems 120a-f. Client computing systems 130 may comprise any combination of hardware and software suitable to enable interfacing with computing systems 120a-f via hubs 124a-c. For example, client computing systems 130 may comprise user devices such as desktop or laptop computers, pad devices, and/or phone devices.

Client computing systems 130 may be communicatively coupled in any suitable manner to hub computing systems 124a and computing systems 120a-f. In an example embodiment, client computing systems 130 may access hub computing systems 124a and computing systems 120a-f via network 112, which may comprise the Internet and/or any similar network. According to another aspect of the disclosed embodiments, and as illustrated in FIG. 1A, client computing systems 130 may be arranged with hub computing systems 124 in a hub-and-spoke configuration.

As shown in FIG. 1A, hub computing systems 124a-c are communicatively coupled with computing systems 120, client systems 130, as well as with each other. Hub computing systems 124a-c are programmed to relay data between computing systems 120, between client computing systems 130 and computing systems 124a-c, and between hub systems 124. In the example embodiment, the hub computing systems 124a-c may be communicatively coupled via network 112, which may comprise any suitable networking topology including the Internet. Computing hubs 124 may comprise any suitable combination of computing hardware and software to provide the functionality as described herein. It will be appreciated that while FIG. 1A depicts each computing system 120 being communicatively coupled to one hub, one or more computing systems 120 may be communicatively coupled to multiple communication hubs 124 in any suitable arrangement. In other words, each computing system 120 may be coupled to more than one communication hub 124. Moreover, and as noted in connection with FIG. 1B, each computing system 120 may be directly connected to one or more other computing systems 120 without use of a communication hub 124.

The communicative coupling allows for computing systems 120a-f which may be associated with any one of the hub computing systems 124a-c to communicate with other of the computing systems 120a-f which may be connected to another hub computing system 124a-c. In an example embodiment, computing systems 120a-f, client computing systems 130, and hub computing systems 124a-c are programmed to operate in peer-to-peer configuration relative to each other. Accordingly, any one computing system 120a-f, 130, and 124a-c may communicate messages and data to any other of computing systems 120a-f, 130, 124a-c in network 110.

Figure 1B:
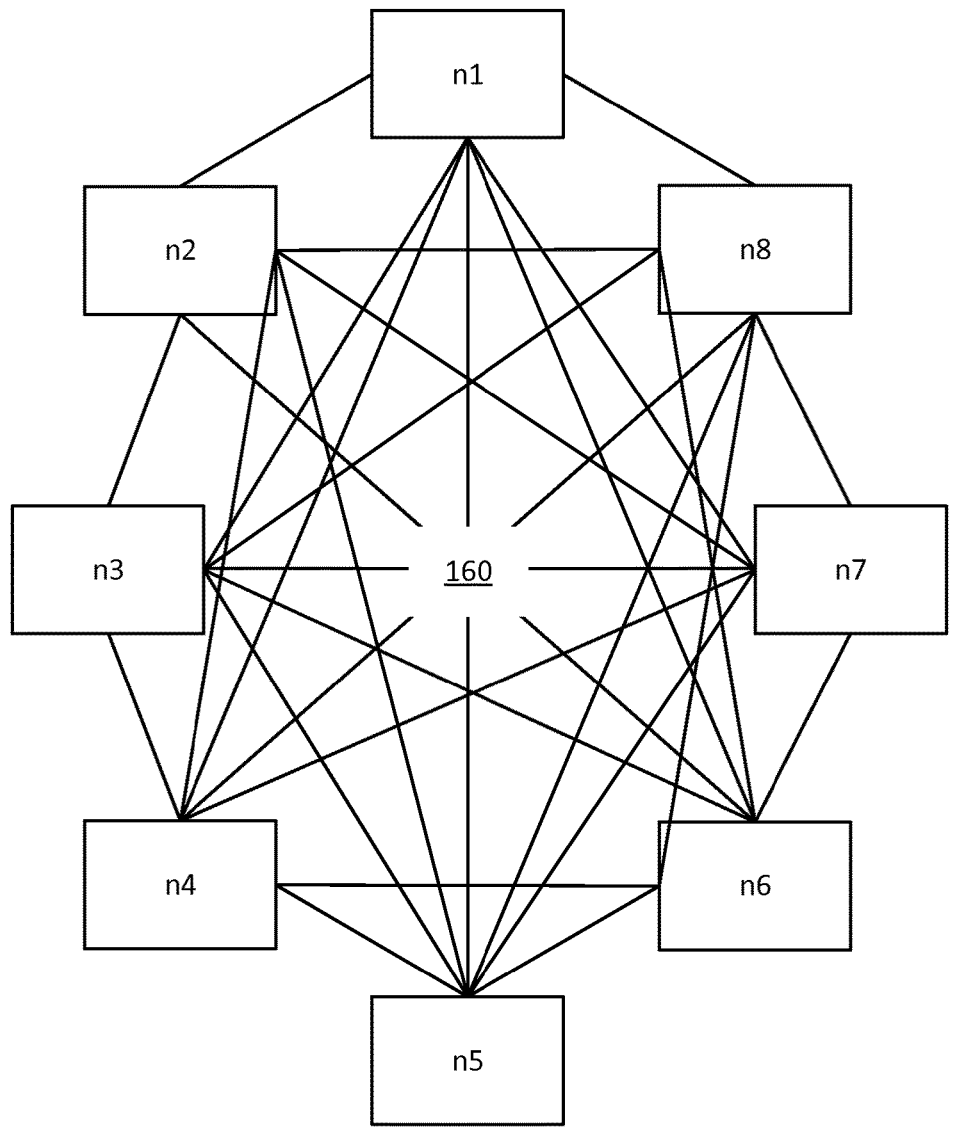
FIG. 1B depicts an example computing network.

In an example embodiment, computing systems 120a-f, hub computing systems 124a-c, and client computing systems 130 are addressable points within network 110 and may be referred to as network nodes. According to another aspect of the disclosed embodiments, systems or nodes 120, 124, and 130 may be configured to operate as a mesh network. In such an embodiment, each system or node in the network is programmed to relay data and messages to other nodes in the network. In an example embodiment depicted in FIG. 1A, data and instructions may be routed from one node in the network, e.g., computing system 120a, to another node in the network, e.g., computing system 120d, via the intermediate network nodes, e.g., hub computing systems 124a and 124b. FIG. 1B illustrates another example network arrangement of nodes which are arranged in a mesh network. As shown in FIG. 1B, nodes n1 through n8 that are connected via a mesh network 160. The specific topology can vary, and the network 160 may include any number of routers and other network devices. In an embodiment such as is shown in FIG. 1B, the nodes, which may be servers, may be coupled to each other without use of communication hubs. Further, each node may have communication connections with multiple hubs so as to facilitate direct communication. The network 160 may include one or more wide area networks (WANs) such as the Internet and/or one or more local area networks (LANs). Nodes n1 through n8 may be suitable computing devices such as servers having one or more processors and memory. Together, nodes n1 through n8 may form a multi-node computing environment that may execute applications that simulate various environments, such as in a multi-player video game. It should be appreciated that the network topology illustrated in FIG. 1B has been greatly simplified and that more networks and nodes may be utilized such as, for example, that depicted in FIG. 1A. These topologies and devices should be apparent to those skilled in the art. It should also be appreciated the example systems described in FIGS. 1A and 1B are merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server or other computing device may comprise any combination of hardware or software that can interact and perform the described types of functionality, including without limitation desktop or other computers, database servers, network storage devices and other network devices. In addition, the functionality provided by the illustrated functions indicated as modules may in some embodiments be combined in fewer modules or distributed in additional modules. Similarly, in some embodiments the functionality of some of the illustrated modules may not be provided and/or other additional functionality may be available.

Referring to the embodiment depicted in FIG. 1A, data objects 140a-f may be stored on and/or controlled by computing systems 120a-f. For example, in an embodiment wherein computing systems 120a-f provide simulation server processing in connection with on-line gaming, data objects 140a-f may be objects representing features and items in an on-line game. In an example scenario, a data object 140 may correspond to a color of a background or an object in a virtual game.

Particular computing systems 120a-f may be considered the owner or controller of particular data objects 140a-f. For example, the particular computing system or node 120a-f, which controls access to the particular data item, and/or which has authority to modify the data object may be referred to as the data object owner node or data object master node. In an example scenario, computing system or node 120a may be designated as the data object owner or controller of data object 140a. Similarly, computing system or node 120d may be designated as the data object owner or controller of data object 140d. It will be appreciated that while in the example depicted in FIG. 1A, each computing system 120 has one data object 140 depicted as being "owned" or "controlled" by the particular computing node, any one computing system 120 or node may have numerous data objects for which the particular computing node is the object owner or controller.

In the example embodiment depicted in FIG. 1A, several data objects have been replicated or copied to other of the computing nodes other than the owner nodes. For example, a replica of data object 140a, which is owned by computing node 120a, has been made on computing nodes 120c and 120e. Similarly, a replica of data object 140b, which is owned or controlled by computing node 120b, has been made on computing nodes 120a and 120c. A replica of data object 140f, which is owned or controlled by node 120f, has been made on computing node 120e. It will be appreciated that replicated data objects such as illustrated in FIG. 1A allow computing nodes to access a current status of a particular data object without having to traverse the network. However, where a node requires to modify a particular data object, a request is forwarded over the network to the node that owns the particular object.

A data object owner node is programmed to receive requests and to read and/or modify the particular data object owned by the node in response to requests from other nodes on the network. For example, computing system 120a may be programmed to receive requests to read and/or modify data object 140a. Likewise computing system 120d may be programmed to received requests to access and/or modify data object 140d. The requests may originate from client computing systems 130 and/or from other computing systems 120 in network 110. Where numerous nodes request access to the data object, the data object owner node may be programmed to queue and prioritize the requests.

It may be useful in some instances to transfer object ownership from one network computing system or node 120 to another node and to have the first or original data object owner node continue operating after the transfer of ownership. For example, computing system 120a may service numerous requests for data object 140a that originate from client computing system 140d. In such a scenario, it may be more efficient and conserve network bandwidth to reassign or migrate ownership of the particular object to a computing system or node located in proximity to the nodes from which the requests are originating. More particularly, it may be desirable to reassign or migrate ownership of data object 140a from computing system 120a to computing system 120d.

The determination of whether or not to reassign or migrate ownership of a data object may be made in any suitable manner. In an example embodiment, the existing object owner, and in particular, a load balancing module, may determine to migrate ownership based upon data it collects regarding its processing capacity as well as the frequency of requests received from other computing nodes. In another embodiment, an external system such as, for example, another computing node may determine based upon information collected regarding the network that a reassignment should be made and communicate a command or request to the current data object owner to reassign ownership.

Figure 2:
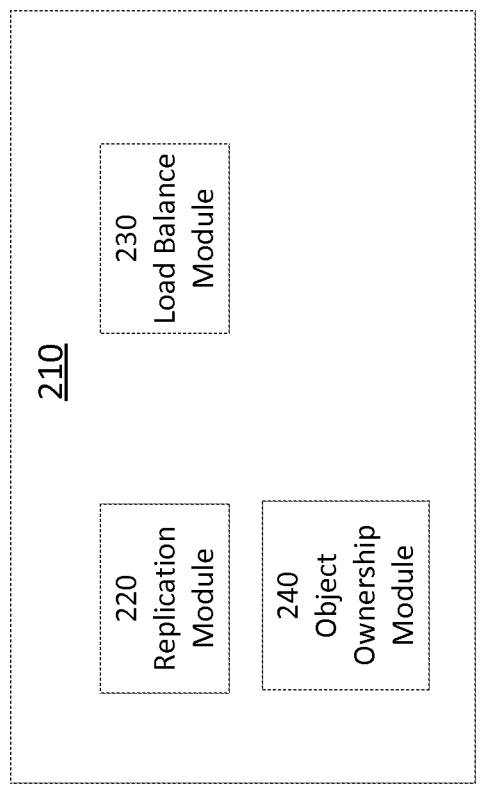
FIG. 2 depicts functional components of an example computing node.

FIG. 2 depicts example processing modules or functionality that may be comprised in any of nodes 120, 124, 130. As show, in the example embodiment, a computing node 210 may comprise replication module 220, load balancer module 230, and object ownership migration module 240.

Replication module 220 provides processing for controlling and implementing the movement of copies or replicas of data objects in network 110. Load balancer module 230 corresponds to, amongst other processing, determining whether or not to migrate ownership of an object from a first computing node to another. Object ownership module 240 corresponds to processing to implement migration of ownership from a first computing node to another.

Example Object Owner Migration Processing

Figure 3:
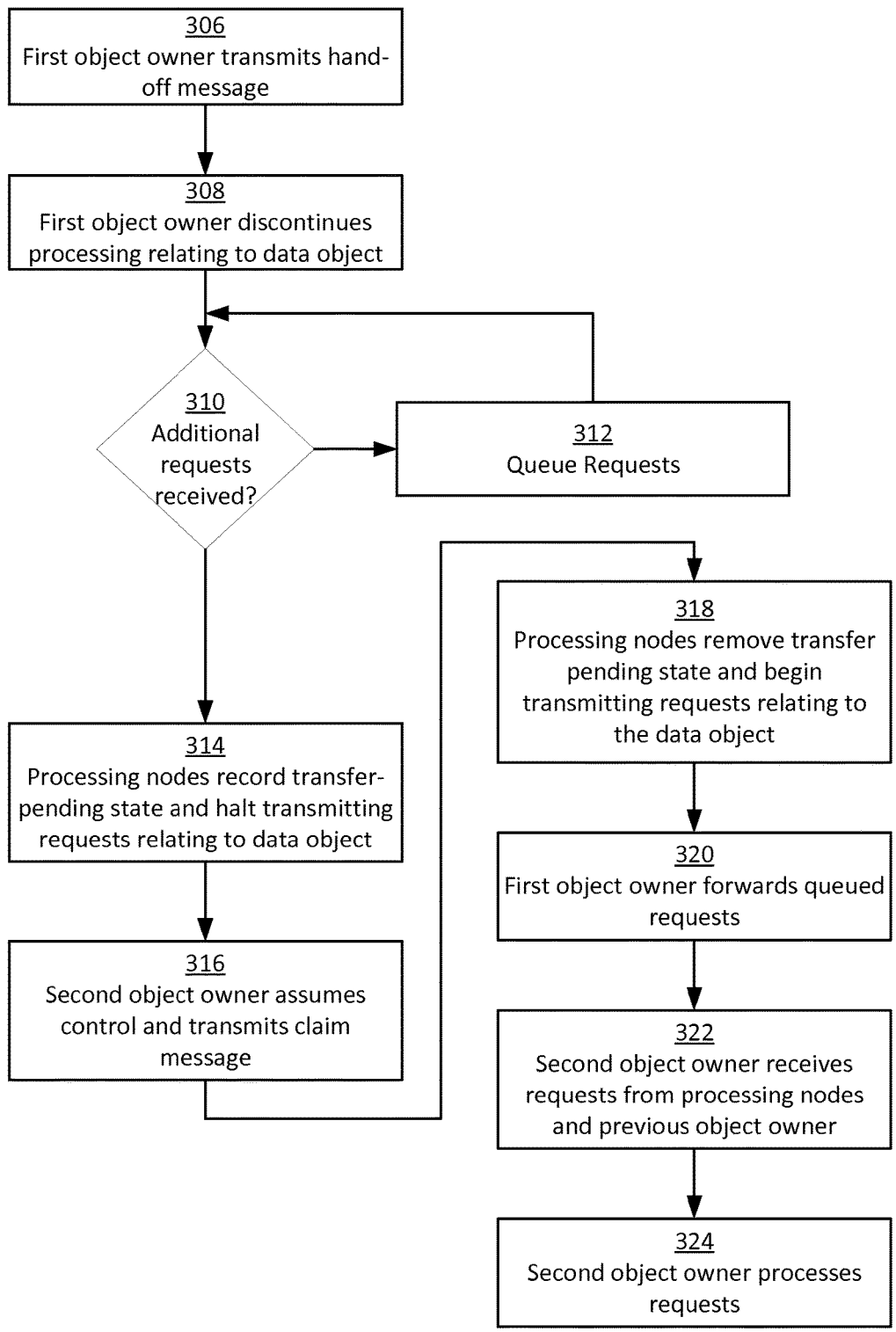
FIG. 3 depicts a flow diagram of example processing for reassigning control of a data object.

FIG. 3 depicts a flow chart of example processing for migrating data object ownership from one computing node to another. More particularly, FIG. 3 depicts an example process employing a hand-off/commit processing paradigm. As shown at block 310, once it has been determined by load balance module 230 operating on a computing node that data object ownership should be migrated or reassigned to a different node, the existing or current data object owner system or node generates and communicates a message indicating control of the particular data object is being handed off or transferred to a second computing system. The message may be referred to as, for example, the hand-off message. In an example scenario, computing system 120a, which is the existing or current owner or controller of data object 140a, and in particular, object ownership module 240, generates and communicates a hand-off message indicating control of data object 140a is being migrated to computing system 120d. The hand-off message may have any suitable format and may comprise, for example, information identifying the current object owner system and the second computing system to which control or ownership is being transmitted. In the example scenario, the hand-off message may comprise information identifying computing system 120a as the current object owner and information identifying computing system 120d as the new object owner to which ownership or control is being transferred.

The hand-off message may comprise any additional information suitable for performing the migration of ownership of the particular data object. In an example scenario, the hand-off message may comprise information specifying a sequence that indicates to which object ownership transfer in a series of ownership transfers the particular message corresponds. In some scenarios, there may be several rapid changes in the ownership of a data object. For example, the ownership of object 140a may be migrated in rapid succession from computing system 120a, to computing system 120d, and then to computing system 120c. In such an embodiment, the hand-off message may further comprise information identifying a sequence in a series of handovers to which the particular message corresponds. For example, in an example scenario wherein ownership of data object 140a is being re-assigned from computing system 120a to 120d, and the hand-off is the first that was made for data object 140a, the hand-off message may contain sequence data identifying the migration is the first for the particular data object. In an example scenario wherein ownership of data object 140a had previously been reassigned from computing system 120b to 120a, the hand-off message may contain sequence data identifying that migration is the second reassignment of ownership for the particular data object.

The hand-off message is communicated over network 110 to nodes in network 110 that interact with data object 140a. For example, the message is transmitted to those computing systems or nodes that receive updates to the particular data object or that request to make changes to the data object. The existing data object owner, e.g., computing system 120a, may determine the particular systems or nodes that are to receive the hand-off message using any suitable mechanism. In an example embodiment, existing data object owner 120a may query or make a request to a system that tracks nodes that interact with particular data objects. After querying the system, existing data object owner 120a communicates the hand-off message for receipt at the identified nodes. In an example scenario, existing data object owner 120a may determine that computing systems 120c and 120e interact with data object 140a. Both computing systems 120c and 120e comprise a replicated copy of data object 140a.

At step 308, current or first data object owner 120a discontinues processing requests relating to the particular data object 140a. For example, current or first data object owner 120a ceases processing related to forwarding information related to data object 140a to other nodes in network 110. Additionally, the current or first data object owner node 120a halts processing requests received at the first data object owner 120a relating to data object 140a.

As illustrated by decision block 310, once the first data object owner 120a determines that ownership of object 140a is being reassigned, and continuing after transmitting the hand-off message, first data object owner 120a determines whether additional requests relating to the data object 140a are received at first data object owner 120a. In an example scenario, and as illustrated at block 312, first data object owner 120a stores the received requests in a queue of requests that is maintained for requests received at the object owner node during the period when ownership is being transmitted. The queued requests are subsequently transmitted to the new data object owner. It will be appreciated that in an example embodiment, each request comprises information specifying information that allows the request to be ordered relative to other requests. For example, each request when initially created may have been given a timestamp that corresponds to when the request was generated. This information may be used by a subsequent object owner to order the processing of requests.

The hand-off message indicating ownership or control of the data object is being transferred is received over the network of nodes at each of the plurality of computing systems or nodes that interact with the particular data object. In an example embodiment, the hand-off message may be received at computing nodes 120c and 120e which are determined to interact with data object 140a.

At step 314, in response to receiving the message indicating control of the data object is being transferred to the second computing system, each of the computing systems or nodes that receives the message halts transmitting of requests relating to the data object. For example, in the scenario wherein computing system 120e receives the hand-off message, computing system 120e halts formatting and forwarding requests to read and/or modify data object 140a. Additionally, each of the computing nodes that receives the hand-off message identifies that a transfer of control of the data object 140a is pending. In an example scenario, computing nodes 120c and 120e, which received the message indicating control of the data object is being transferred, may identify that the particular data object 140a is in a pending-transfer state. For example, each of computing nodes 120c and 120e may make an entry in a queue maintained for data objects being reassigned that the particular data object 140a is being reassigned.

The hand-off message indicating ownership or control of the data object 140a is being transferred is received over the network 110 at the second computing system or node 120d to which ownership is being transferred. At block 316, in response to receiving the message indicating control of the data object 140a is being transferred to the second computing system, second computing system 120d assumes control of data object 140a and transmits a message claiming second computing system 120d has assumed control or ownership of the data object. In an example scenario, second computing system 120d may mark a data flag relating to the particular data object to indicate that it (second computing system 120d) is the owner or controller of the object. The message claiming ownership of the data object is transmitted via the network of nodes 110 to systems or nodes that interact with the data object. In an example embodiment, new data object owner 120d may query or make a request to a system that tracks nodes that interact with particular data objects. After querying the system, new data object owner 120d communicates the hand-off message for receipt at the identified nodes. In an example scenario, the new data object owner 120d communicates the hand-off message for receipt at computing system 120c and 120e as a consequence of their being identified as interacting with data object 140a.

The message claiming control of the data object is received at each of the plurality of computing systems or nodes that interact with the particular data object. In the exemplary scenario, the message claiming control of data object 140a is received at each of computing systems 120c and 120e which were determined to interact with data object 140a.

At block 318, in response to the message indicating the second computing system has control of the data object, each of the computing systems or nodes that receives the claim message identifies that a transfer of control to the second computing system has taken place and that the data object is no longer in the pending-transfer state. In the example scenario, each of nodes 120c and 120e that receive the claim ownership message identifies that ownership or control has been transferred to second computing system 120d and identifies that data object 140a is no longer in the pending-transfer state. In an example scenario wherein each of the computing systems or nodes 120c and 120e maintain a queue of data objects that are being reassigned, each computing node may remove data identify data object 140a from the queue. In the scenario wherein ownership of the particular data object has been transferred several times in succession, the computing nodes 120c and 120e may employ data identifying a sequence number associated with the particular claim ownership message in order to correctly match the message to a corresponding entry in the queue. Additionally, in response to the message indicating ownership of the data object has been claimed, each of the computing nodes 120c and 120e that receive the claim message resumes transmitting of requests relating to data object 140a. Accordingly, any requests that computing nodes 120c and 120e may have queued while data object 140a was in the pending-transfer state are transmitted for processing at the new data object owner. In an example scenario, the newly transmitted requests are communicated over the network 110 of nodes to the new owner/controller—second computing system 120d.

The message claiming control of data object 140a is also received at the first computing system 120a which is the original object owner or controller. At block 320, in response to the claim message indicating second computing system 120d has assumed control of data object 140a, first computing system 120a transmits to second computing system 120d requests relating to data item 140a that were received by the first computing system 120a after it transmitted the hand-off message indicating control of data object 140a was being transferred to second computing system 120d. In an example scenario, first computing system 120a may transmit requests relating to the data object 140a that were received and stored in a queue maintained by first computing system 120a. The requests may be transmitted in any suitable manner. In an example embodiment, the requests may be transmitted together as a group. In another example embodiment, the requests may be transmitted separately in a first-in-first-out manner. The requests are transmitted over network 110 to the second computing system 120d.

At block 322, second computing system 120d receives requests relating to data object 140a from the plurality of computing systems that interact with the data object. In an example scenario, second computing system 120d may receive requests transmitted from computing systems 120c and 120e. Similarly, requests relating to data object 140a are received from first computing system 120a. For example, second computing system 120d may receive any requests that may have been queued by computing system 120a after it transmitted the original hand-off indicating control of data object 140a was being transferred to second computing system 120d.

Figure 4:
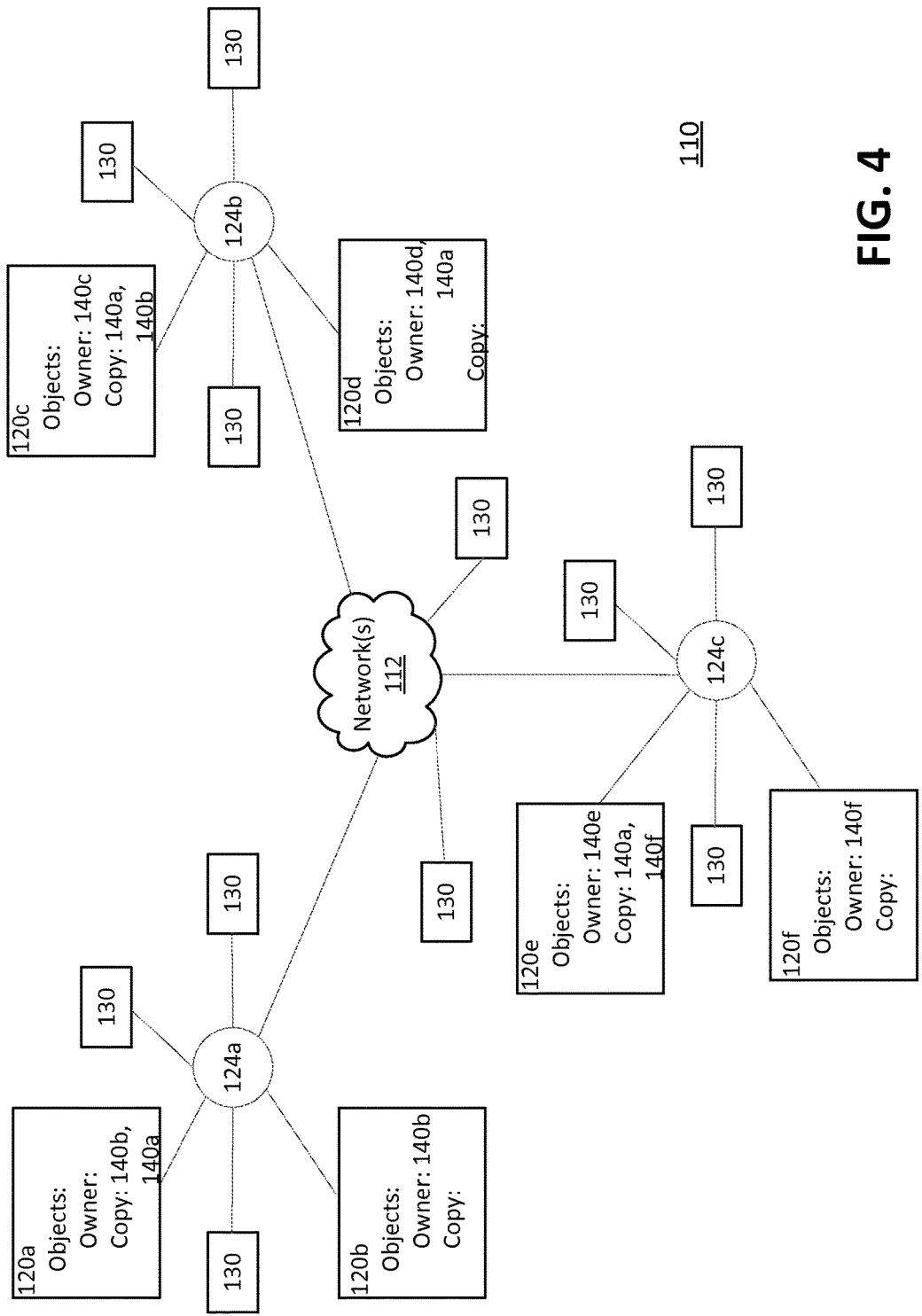
FIG. 4 depicts an example computing network.

FIG. 4 depicts the example computing network of FIG. 1A after migration of ownership of data object 140a from computing system 120a to computing system 120d. As shown, data object 140a is illustrated as being owned or controlled by computing system 120d. In an example embodiment, the computing system 120a maintains a copy of data object 140a.

Referring back to FIG. 3, at block 324, second computing system 120d, the new data object owner or controller, may process the received requests relating to data object 140a in any suitable manner. In an example scenario, second computing system 120d may process each request as soon as it is received and regardless of the source of the request. For example, requests received from the individual computing nodes 120c and 120e, if received prior to the requests received from original object owner 120a, may be processed before the request from first data object owner 120a. In this scenario, requests that were received and queued at the first data object owner 120a may ultimately be processed by second computing system 120d after requests that originated later from the plurality of computing nodes 120c and 120e. In an alternative example embodiment, second computing system 120d may prioritize or order the requests received from first computing system 120a and process all of the requests received from first computing system 120a before processing requests from the plurality of computing nodes 120c and 120e. In still another example embodiment, second computing system 120d may order requests for processing based upon the time that the requests were originally generated by the requesting node. For example, each request may have information accompanying therewith that specifies when the request was initially generated. Each of the requests that may have been stored in a queue of either the first computing system 120a or one of the computing systems 120c or 120e may have a time stamp identifying when the request was generated. Second computing system 120d may order the requests in order of the time stamp and process the requests in that specified order.

In embodiments such as those explained in connection with FIG. 3, wherein ownership or control of a data object is transferred using a hand off message from the original data object controller, followed by a claim message from the computing system to which ownership is being transferred claiming ownership, the transfer of ownership occurs relatively quickly. The transfer of object ownership is completed in the time that it takes to complete one round trip message cycle containing both a request and an acknowledgement. In terms of the example processing of FIG. 3, the processing time comprises the time needed for the hand-off message to be communicated from the original data object owner to the new object owner, and the time that the claim message claiming ownership is communicated from the new owner to the previous owner and the plurality nodes that are interested in the particular data item.

It will be appreciated that while the processing described in connection with FIG. 3 may be used to implement a relatively expedited exchange of data object ownership, such processing, depending upon how implemented, may result in requests being processed out of order from which they were originally generated. Applicant has developed additional methods of performing data object ownership transfers that preserve the order of requests during the transfer. In an example embodiment, the first object owner and nodes that interact with the particular data object being transferred suspend activity relating to the data object. Once activity has been suspended, the first object owner forwards any request that have been queued at the first object owner to the second object owner and instructs the second object owner to take ownership of the data object. When requests are thereafter received at the second object owner from the nodes that interact with the data object, the requests are received after those that were originally queued at the first object owner. Accordingly, the order of requests is preserved in the handover from the first object owner to the second.

Figure 5A:
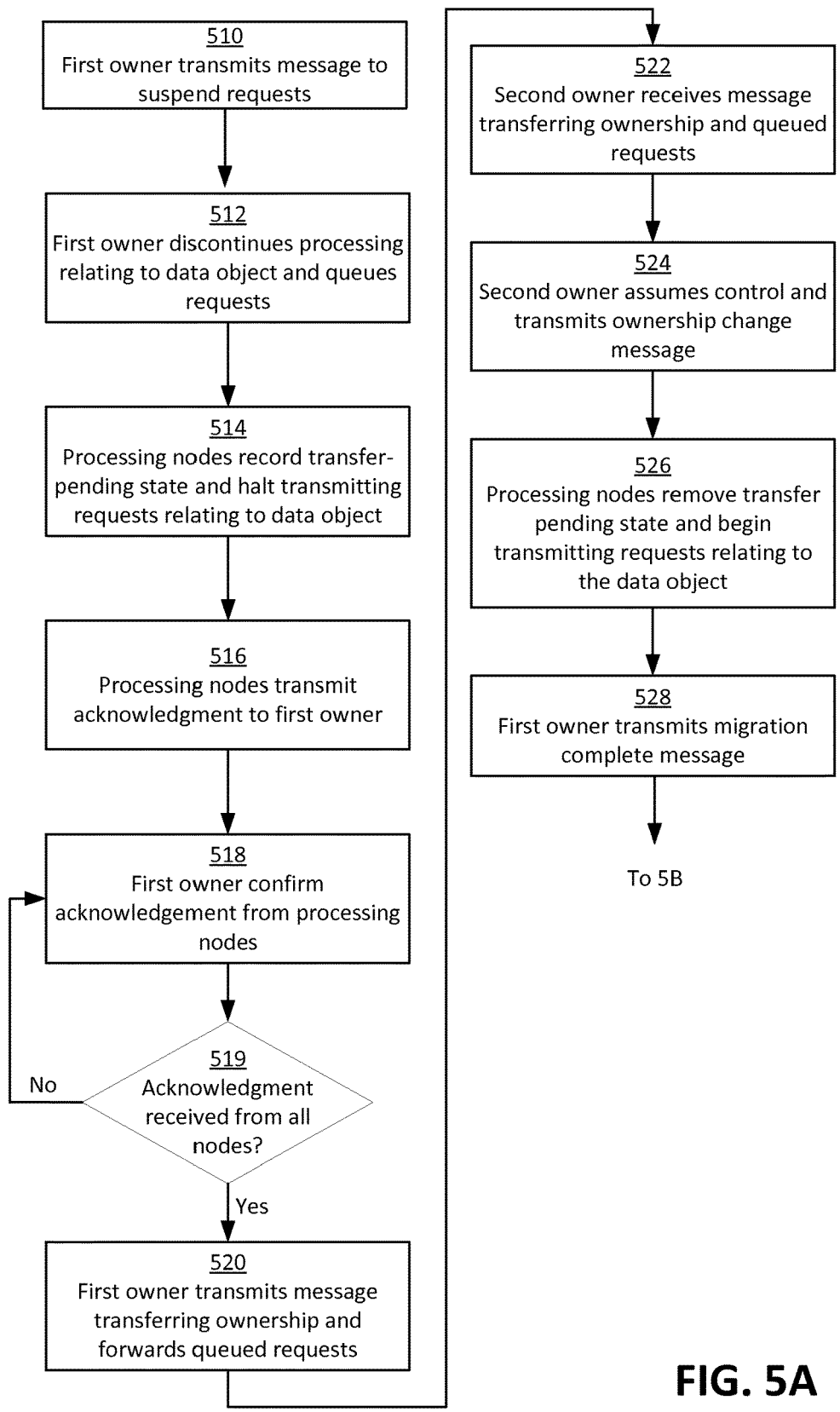
FIGS. 5A-B depict a flow diagram of example processing for reassigning control of a data object.
Figure 5B:
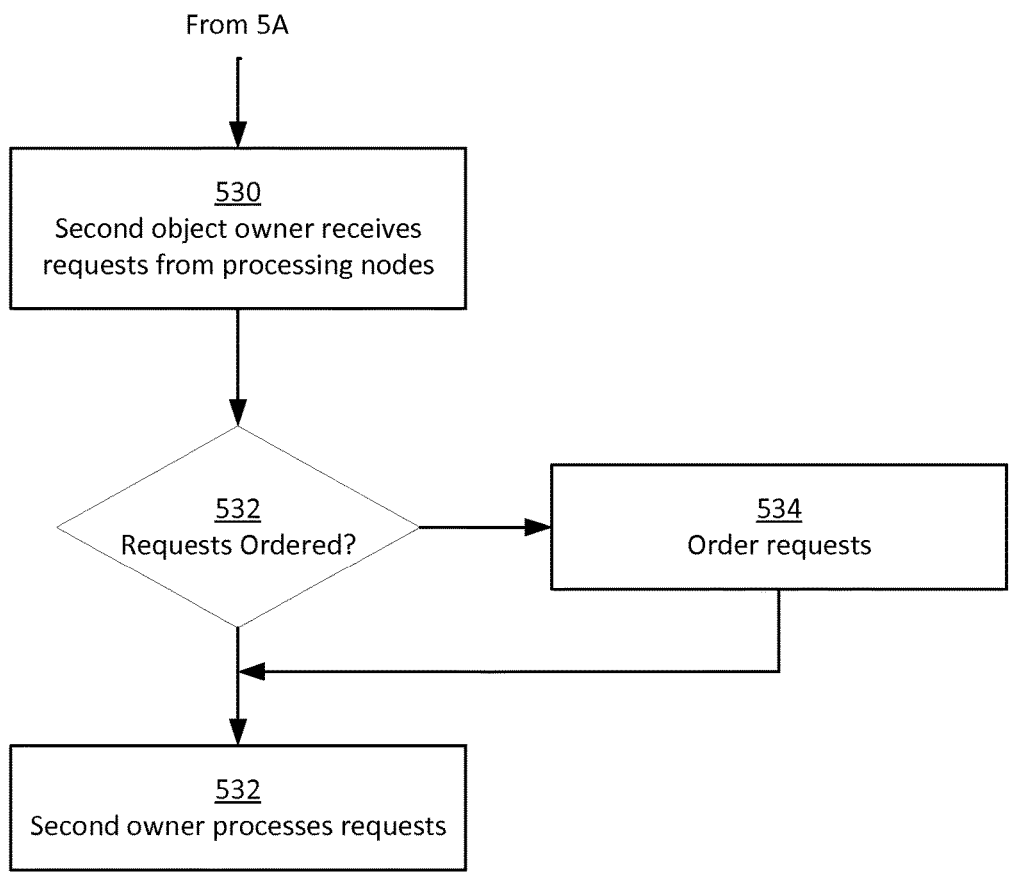

FIG. 5A-B provide a flow chart of example processing for reassigning data object ownership while preserving message order. Referring to FIG. 5A, at block 510, the existing or current data object owner system or node, generates and communicates a message for computing system nodes that interact with the particular object to suspend or halt transmitting requests relating to the particular data object. In an example scenario such as depicted in FIG. 1A, computing node 120a may be the existing data object owner with respect to data object 140a. In such a scenario, computing node 120a may communicate a message to computing nodes 120c and 120e which have been identified as interacting with data object 140a. The message transmitted by the current data object owner may indicate that the request to suspend is in connection with a process of migrating or reassigning ownership of the data object. The message may have any suitable format and may comprise, for example, information identifying the current object owner system. e.g., 120a, and the second computing system, e.g., 120d, to which control or ownership is being transmitted.

In addition to communicating a message notifying nodes of the data object ownership hand-off, and as noted at block 512, the current or first data object owner discontinues or suspends processing requests relating to the particular data object. In an example scenario, current or first data object owner node 120a may cease processing related to forwarding information related to data object 140a. Additionally, current data object owner node 120a may halt processing requests received at first data object owner node 120a relating to data object 140a. In an example embodiment, once the first data object owner determines that ownership of the object is being reassigned, and continuing after the first data object owner transmits the message indicating to suspend forwarding requests, the first data object owner records requests relating to the data item received. In an example scenario, first data object owner node 120a may store the received requests in a queue where the requests are recorded for later forwarding to the new data object owner 120d. It will be appreciated that in an example embodiment, each request comprises information that would allow the request to be ordered relative to other requests. For example, each request when initially created may have been given a timestamp that corresponds to when the request was generated. This information may be used by a subsequent object owner to order the processing of requests.

The message requesting to suspend transmitting requests relating to the data object is received over the network of nodes 110 at each of the plurality of computing systems or nodes that interact with the particular data object. Referring to block 514, in response to receiving the message, each of the computing systems or nodes halts transmitting of requests relating to the data object. Additionally, each of the computing nodes that receives the suspend message may internally identify or record that a transfer of control of the data object is pending. In an example scenario where computing nodes 120c and 120e were identified as interacting with data object 140a, each of computing nodes 120c and 120e may identify and record that data object 140a is in a pending-transfer state. For example, each of computing nodes 120c and 120e may note with an entry in a queue maintained for data objects being reassigned that data object 140a is being reassigned. Each of the computing nodes that interact with the particular data object may store requests relating to the data object in a queue during the time that control is being transferred. The requests may comprise time stamp information indicating when the request was generated. This information may be used later in processing in order to order the processing of the request relative to other requests.

After completing their processing in response to the suspend message, at block 516, each of the plurality of computing systems or nodes that received the suspend message, e.g. nodes 120c and 120e, generates and transmits an acknowledgment to the first data object owner node 120a.

At block 518, the first data object owner node confirms receipt of the acknowledgements from the plurality of computing systems. At block 519, the first data object owner determines whether acknowledgement has been received from all of the plurality of computing systems that have an interest in the data object and which were sent the initial message by the first data object owner. If acknowledgements have not been received from each of the computing systems, processing continues at block 518. Accordingly, the first data object owner monitors the acknowledgements and identifies when acknowledgments have been received from each of the plurality of computing systems or nodes to which the message to suspend was transmitted. In an example scenario, first data object owner 120a may monitor for receipt of acknowledgment from nodes 120c and 120e. By confirming all acknowledgments have been received from all interested nodes, first data object owner 120a may be reasonably certain that all requests in network 110 relating to the data object 140a have been suspended or are queuing at first data object owner node 120a.

If it is determined at block 519 that acknowledgment has been received from each of the plurality of computing systems to which the suspend message was transmitted, processing continues at block 520, where the first data object owner node generates and transmits a message to a second computing system, i.e., the new data object owner, directing the second computing system to take control of or authority. In an example scenario, first data object owner 120a may transmit a message instructing second data object owner 120d to take control or authority for data object 140a.

Additionally, the first data object owner transmits the requests relating to the data object that have been queued at the first computing node during the period processing has been suspended. In an example scenario, data object owner 120a transmits the requests relating to data object 140a that have been received in its queue since suspending activity relating to the data object. It will be appreciated that in an example embodiment, each of the forwarded request may comprise a time stamp corresponding to when the request was generated.

At block 522, one or more messages transferring ownership and forwarding queued requests relating to the particular data object are received at the second computing node 120d. It will be appreciated that the second computing node, i.e., the new object owner, at this point in the process has the requests that were originally received and queued at the first object owner. The second computing node may process the requests beginning immediately. In an instance wherein the second computing node begins processing the requests immediately, the second computing node may process the requests in the order as dictated by time stamps that may be associated with each of the requests.

At block 524, in response to receiving the message indicating control of the data object is being transferred to the second computing system, the second computing system assumes control of the data object and transmits a message indicating the second computing system has assumed control or ownership. In an example scenario, second computing node 120d may mark a data flag relating to data object 140a to indicate that data object 140a is the owner or controller of object 140a. The message claiming ownership of the data object is transmitted via the network of nodes to systems or nodes that interact with the data object. In an example scenario, the message asserting ownership is communicated via network 110 to computing nodes 120c and 120e.

At block 526, the message claiming control of the data object is received at each of the plurality of computing systems or nodes that interact with the data object. In an example embodiment, the requests may be received at computing nodes 120c and 120e. In response to the message indicating the second computing system has control of the data object, each of the computing systems or nodes identifies that a transfer of control to the second computing system has taken place and that the data object is no longer in the pending-transfer state. In an example scenario wherein computing nodes 120c and 120e maintain queues for data objects that are being reassigned, the computing nodes may remove the particular data object from the queue. Additionally, in response to the message indicating the data object has been claimed, each of the computing nodes 120c and 120e resume transmitting of requests relating to the data object. Accordingly, any requests that a particular computing node may have queued while the data object was in the pending-transfer state are transmitted for processing. The newly transmitted requests are communicated over network 110 to second computing system 120d.

The message claiming control of the data object is also received at the first computing system 120a which operated as the original or first object owner. At block 528, in response to the message indicating second computing system 120d has assumed control of the data object, first computing system 120a transmits to the second computing system a message indicating the migration or reassignment of control of the data object is complete.

Referring to FIG. 5B, at block 530, the second data object owner node receives the message indicating processing is complete as well as the requests relating to the data object from the plurality of computing systems that interact with the data object. In an example scenario, node 120d receives the migration complete message from node 120a and receives the requests relating to data object 140a from nodes 120c and 120e. Referring again to FIG. 4, the status of network 110 is shown after migration of ownership of data object 140a from computing system 120a to computing system 120d is shown. Data object 140a is illustrated as being owned or controlled by computing system 120d. In an example embodiment, the computing system 120a maintains a copy of data object 140a.

At block 532, new data object owner or controller 120d determines whether the requests that it has received are ordered. For example, controller 120d determines whether the requests are ordered according to the time at which the requests were generated. In an example scenario, controller 120d may use time stamp data associated with each request to determine whether the requests have been received in an order that corresponds to the order in which the requests were generated. If not, at block 534, controller 120d may place the requests in order. For example, controller places the requests in order of the time the requests were generated.

Processing continues at block 536, where new data object owner or controller 120d processes the received requests for data object 140a in any suitable manner. It will be appreciated, that the processing as discussed in connection with FIGS. 5A-B attempts to preserve the order of the requests for the data objects. In particular, the requests received at and queued by first object owner 120a are received at second object owner 120d at block 522, which is before the requests from the various nodes that interact with the particular data object are received at block 530. The second object owner 120d may process the requests in any suitable manner and has the option of processing the requests in the order received from first object owner 120a and nodes 120c and 120e which is likely consistent with the order the requests were originally made. For example, second object owner 120d may process the requests received from first object owner 120a upon receipt, prior to processing the requests from nodes 120c and 120e which are received by second object owner 120d later in the processing. In connection with processing requests received from both first object owner 120a and processing requests from nodes 120c and 120e, second object owner 120d may process the requests in the order designated by time stamp data that designates for each request the time that the request was generated.

Example Processing Architecture

Figure 6:
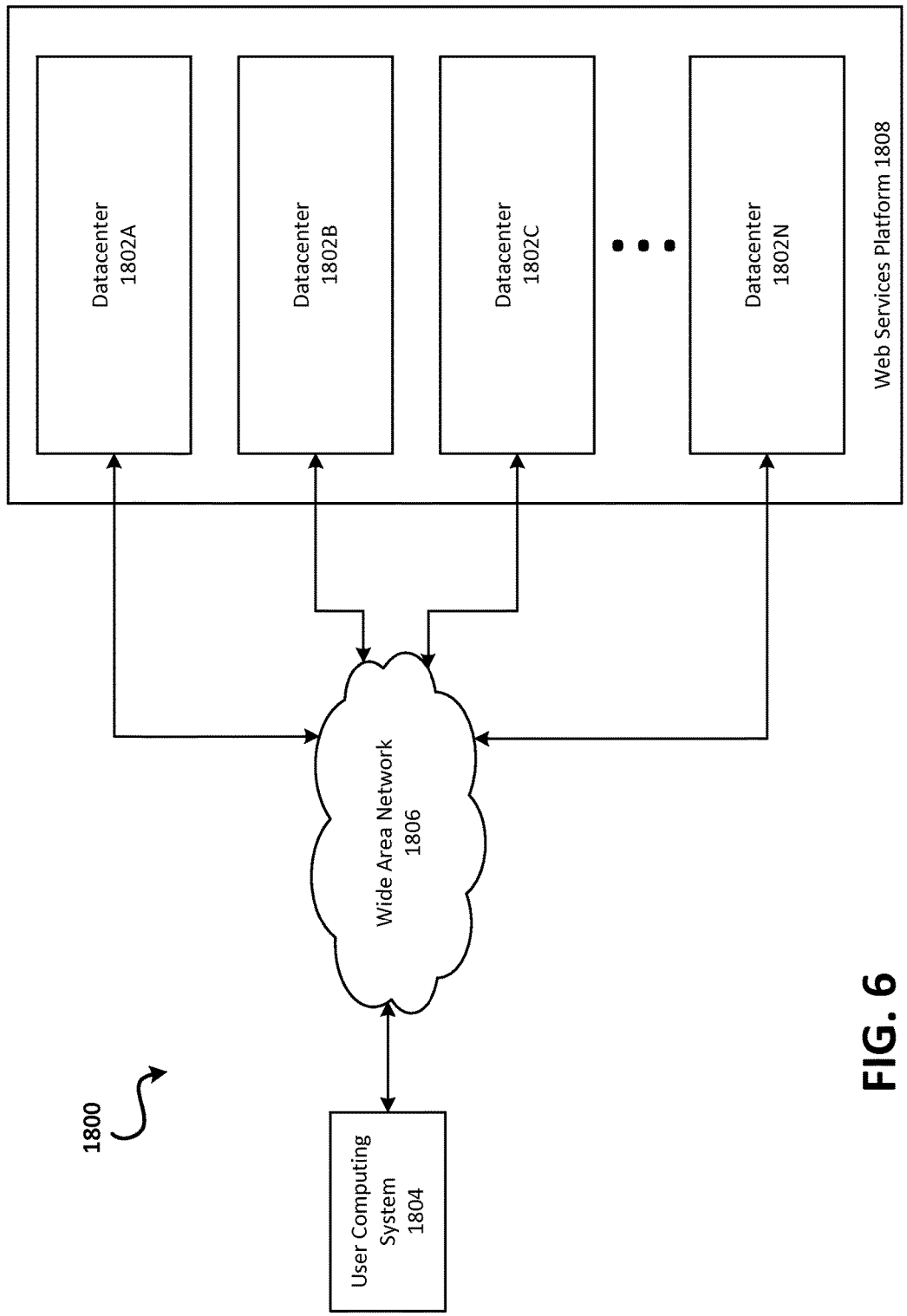
FIG. 6 depicts an example computing arrangement for implementing services accessible.
Figure 7:
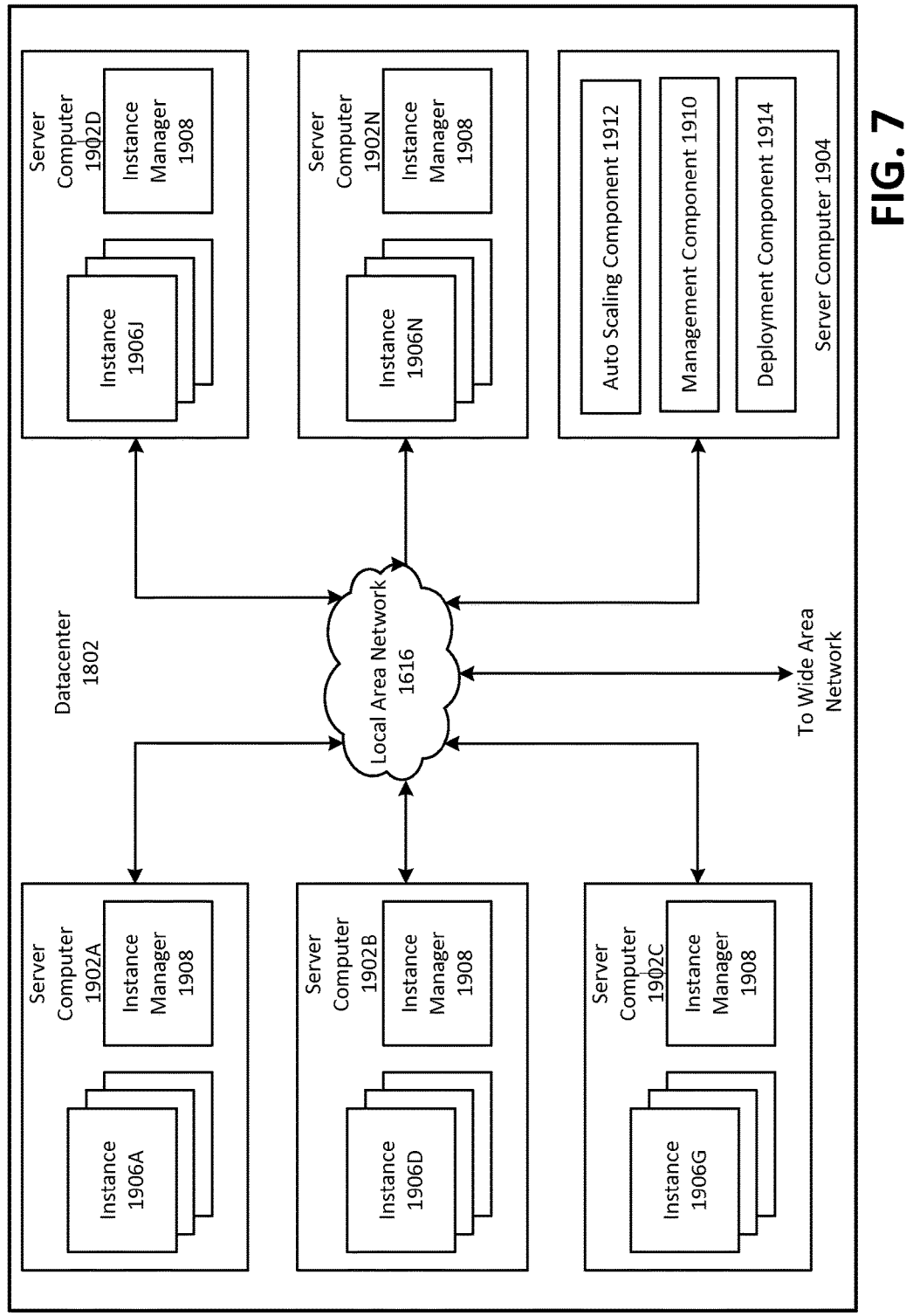
FIG. 7 depicts an example computing arrangement for implementing services accessible.

It will be appreciated that computing system nodes 120 and computing hubs 124 may be comprised in a system architecture adapted to providing web services or cloud based services. User devices 130 may access the architecture via network 112 which may comprise the Internet and/or World Wide Web. FIGS. 6 and 7 depict example operating environments that might be used to implement an on-line service implemented using comprising system nodes 120. Generally, FIG. 6 depicts a web services platform that comprises a plurality of datacenters. FIG. 7 depicts a datacenter that comprises a plurality of computers.

Turning to the details of FIG. 6, this figure depicts an example of a suitable computing environment in which embodiments described herein may be implemented. A cloud service provider (such as web services platform 1808) may configure the illustrated computing environment to host virtual clouds of entities and to enable communication paths between these virtual clouds that may otherwise be isolated. In particular, FIG. 6 is a system and network diagram that shows an illustrative operating environment 1800 that includes a web services platform 1808 for implementing virtual clouds and for providing on-demand access to computer resources, such as virtual machine instances. Web services platform 1808 can provide computer resources for executing applications on a permanent or an as-needed basis and may be configured as a private network. These computer resources may include various types of resources, such as data processing resources, data storage resources, data communication resources, and the like. In an example scenario, the computer resources may be on-line game simulation resources. Each type of computer resource may be general-purpose or may be available in a number of specific configurations. For example, data processing resources may be available as virtual machine instances. The instances may be configured to execute applications, including web servers, application servers, media servers, database servers, and the like. Data storage resources may include file storage devices, block storage devices, and the like.

Each type or configuration of computer resource may be available in different sizes, such as large resources consisting of many processors, large amounts of memory, and/or large storage capacity, and small resources consisting of fewer processors, smaller amounts of memory, and/or smaller storage capacity. Entities may choose to allocate a number of small processing resources as web servers and/or one large processing resource as a database server, for example.

The computer resources provided by web services platform 1808 may be enabled by one or more datacenters 1802A-1802N, which may be referred herein singularly as "datacenter 1802" or in the plural as "datacenters 1802." Datacenters 1802 may be facilities that house and operate computer systems and associated components and may include redundant and backup power, communications, cooling, and security systems. Datacenters 1802 may be located in a same geographical area, such as in a same facility, and may be interconnected using private networks, such as high-speed fiber optic networks, controlled and managed by a service provider of web services platform 1808. Datacenters 1802 may also be distributed across geographically disparate locations and may be interconnected in part using public networks, such as the Internet. One illustrative configuration for datacenter 1802 that implements the concepts and technologies disclosed herein is described below with regard to FIG. 7.

Entities of web services platform 1808 may access the computer resources provided by datacenters 1802 over a Wide Area Network (WAN) 1806. Although a WAN is illustrated in FIG. 6, it should be appreciated that a Local Area Network (LAN), the Internet, or any other networking topology known in the art that connects datacenters 1802 to remote entities and other users may be utilized. It should also be appreciated that combinations of such networks may also be utilized.

An entity or other entities that are users of web services platform 1808 may utilize a computing system 1804 to access the computer resources provided by datacenters 1802. User computing system 1804 comprises a computer capable of accessing web services platform 1808, such as a server computer, a desktop or laptop personal computer, a tablet computer, a wireless telephone, a PDA, an e-reader, a game console, a set-top box, an automobile, an automobile system, a home appliance, a manufacturing device or sensor, a building control system, a farming instrument, or any other computing node or thing that is able to communicate with data center 1802. In an example scenario, computing system 1804 may correspond, for example, devices 130 described above.

In an example scenario, a particular user computing system 1804 may be utilized to configure aspects of the computer resources provided by web services platform 1808. In this regard, web services platform 1808 may provide a web interface through which aspects of its operation may be configured through the use of a web browser application program executing on user computing system 1804. Alternatively, a stand-alone application program executing on user computing system 1804 may access an application programming interface (API) exposed by web services platform 1808 for performing the configuration operations. Other mechanisms for configuring the operation of web services platform 1808, including launching new virtual machine instances on web services platform 1808, may also be utilized.

According to embodiments disclosed herein, capacities of purchased computer resources provided by web services platform 1808 can be scaled in response to demand. In this regard, scaling refers to the process of instantiating, which may also be referred to herein as "launching" or "creating," or terminating, which may also be referred to herein as "de-scaling," instances of computer resources in response to demand.

Web services platform 1808 may also be configured with a deployment component to assist entities in the deployment of new instances of computer resources. The deployment component may receive a configuration from an entity that may include data describing how new instances should be configured. For example, the configuration may specify one or more applications or software components that should be installed in new instances, provide scripts and/or other types of code to be executed in new instances, provide cache warming logic specifying how an application cache should be prepared, and other types of information. The deployment component utilizes the entity-provided configuration and cache warming logic to launch, configure, and prime new instances of computer resources.

FIG. 7 depicts a computing system diagram that illustrates one configuration for datacenter 1802 that implements web services platform 1808. The example datacenter 1802 shown in FIG. 7 may include several server computers 1902A-1902N, which may be referred herein singularly as "server computer 1902" or in the plural as "server computers 1902," for providing computer resources for hosting virtual clouds and for executing applications. Server computers 1902 may be standard tower or rack-mount server computers configured appropriately for providing the computer resources described above. For instance, in one implementation server computers 1902 may be configured to provide instances 1906A-1906N of computer resources.

Instances 1906A-1906N, which may be referred herein singularly as "instance 1906" or in the plural as "instances 1906," may be virtual machine instances. As known in the art, a virtual machine instance is an instance of a software implementation of a machine (i.e., a computer) that executes programs like a physical machine. In the example of virtual machine instances, each server 1902 may be configured to execute an instance manager 1908 capable of executing the instances. Instance manager 1908 may be a hypervisor or another type of program configured to enable the execution of multiple instances 1906 on a single server 1902, for example. As discussed above, each of instances 1906 may be configured to execute all or a portion of an application.

It should be appreciated that although the embodiments disclosed herein are described primarily in the context of virtual machine instances, other types of instances can be utilized with the concepts and technologies disclosed herein. For instance, the technologies disclosed herein may be utilized with instances of storage resources, instances of data communications resources, and with other types of resources. The embodiments disclosed herein may also execute all or a portion of an application directly on a computer system without utilizing virtual machine instances.

Datacenter 1802 shown in FIG. 7 may also include a server computer 1904 reserved for executing software components for managing the operation of datacenter 1802, server computers 1902, and instances 1906. In particular, server computer 1904 may execute a management component 1910. As discussed above, working between FIGS. 6 and 7, an entity of web services platform 1808 may utilize user computing system 1804 to access management component 1910 to configure various aspects of the operation of web services platform 1808 and instances 1906 purchased by the entity. For example, the entity may purchase instances and make changes to the configuration of the instances. The entity may also specify settings regarding how the purchased instances are to be scaled in response to demand. The entity may also provide requests to launch instances to management component 1610.

As also described briefly above, an auto scaling component 1912 may scale instances 1906 based upon rules defined by an entity of web services platform 1908. For example, auto scaling component 1912 may allow an entity to specify scale up rules for use in determining when new instances should be instantiated and scale down rules for use in determining when existing instances should be terminated.

As discussed briefly above, datacenter 1802 may also be configured with a deployment component 1914 to assist entities in the deployment of new instances 1906 of computer resources. Deployment component 1914 may receive a configuration from an entity that includes data describing how new instances 1906 should be configured. For example, the configuration may specify one or more applications that should be installed in new instances 1906, provide scripts and/or other types of code to be executed for configuring new instances 1906, provide cache warming logic specifying how an application cache should be prepared, and other types of information.

Deployment component 1914 may utilize the entity-provided configuration and cache warming logic to configure, prime, and launch new instances 1906. The configuration, cache warming logic, and other information may be specified by an entity using management component 1910 or by providing this information directly to deployment component 1914. Other mechanisms may also be utilized to configure the operation of deployment component 1914.

In the example datacenter 1802 shown in FIG. 7, an appropriate LAN 1916 may be utilized to interconnect server computers 1902A-1902N and server computer 1904. LAN 1916 may also be connected to WAN 1806 illustrated in FIG. 6. It should be appreciated that the network topology illustrated in FIGS. 6 and 7 has been greatly simplified and that many more networks and networking devices may be utilized to interconnect the various computing systems disclosed herein. Appropriate load balancing devices or software modules may also be utilized for balancing a load between each of datacenters 1802A-1802N, between each of server computers 1902A-1902N in each datacenter 1802 and between instances 1906 purchased by each entity of web services platform 1808. These network topologies and devices should be apparent to those skilled in the art.

It should be appreciated that datacenter 1802 described in FIG. 7 is merely illustrative and that other implementations may be utilized. In particular, functionality described herein as being performed by management component 1910, auto scaling component 1912, and deployment component 1914 may be performed by one another, may be performed by other components, or may be performed by a combination of these or other components. Additionally, it should be appreciated that this functionality may be implemented in software, hardware, or a combination of software and hardware. Other implementations should be apparent to those skilled in the art.

Figure 8:
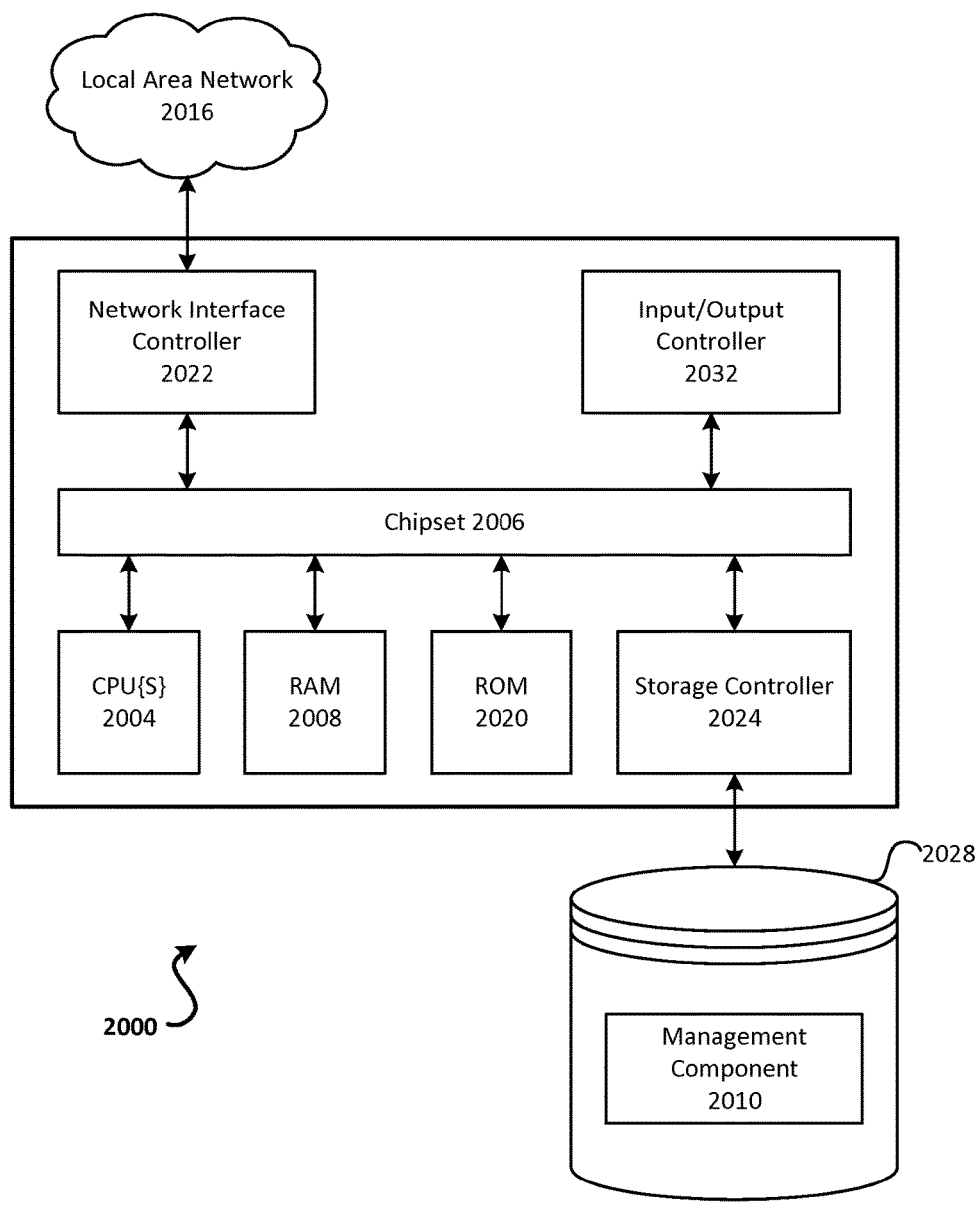
FIG. 8 depicts an example computing system.

FIG. 8 depicts an example computer architecture for a computing system 2000 capable of executing software for performing operations as described above in connection with FIGS. 1-7. The computer architecture shown in FIG. 8 illustrates a conventional server computer, workstation, desktop computer, laptop, tablet, network appliance, PDA, e-reader, digital cellular phone, or other computing node, and may be utilized to execute any aspects of the software components presented herein described as executing on computing nodes 120 and 124, on devices 130, within datacenters 1802A-1802N, on server computers 1902A-1902N, or on any other computing system mentioned herein.

Computer 2000 may include a baseboard, or "motherboard," which is a printed circuit board to which a multitude of components or devices may be connected by way of a system bus or other electrical communication paths. One or more central processing units (CPUs) 2004 may operate in conjunction with a chipset 2006. CPUs 2004 may be standard programmable processors that perform arithmetic and logical operations necessary for the operation of computer 2000.

CPUs 2004 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

Chipset 2006 may provide an interface between CPUs 2004 and the remainder of the components and devices on the baseboard. Chipset 2006 may provide an interface to a random access memory (RAM) 2008 used as the main memory in computer 2000. Chipset 2006 may further provide an interface to a computer-readable storage medium, such as a read-only memory (ROM) 2020 or non-volatile RAM (NVRAM) (not shown), for storing basic routines that may help to start up computer 2000 and to transfer information between the various components and devices. ROM 2020 or NVRAM may also store other software components necessary for the operation of computer 2000 in accordance with the embodiments described herein.

Computer 2000 may operate in a networked environment using logical connections to remote computing nodes and computer systems through LAN 2016. Chipset 2006 may include functionality for providing network connectivity through a network interface controller (NIC) 2022, such as a gigabit Ethernet adapter. NIC 2022 may be capable of connecting the computer 2000 to other computing nodes over LAN 2016. It should be appreciated that multiple NICs 2022 may be present in computer 2000, connecting the computer to other types of networks and remote computer systems.

Computer 2000 may be connected to a mass storage device 2028 that provides non-volatile storage for the computer. Mass storage device 2028 may store system programs, application programs, other program modules, and data, which have been described in greater detail herein. Mass storage device 2028 may be connected to computer 2000 through a storage controller 2024 connected to chipset 2006. Mass storage device 2028 may consist of one or more physical storage units. Storage controller 2024 may interface with the physical storage units through a serial attached SCSI (SAS) interface, a serial advanced technology attachment (SATA) interface, a fiber channel (FC) interface, or other type of interface for physically connecting and transferring data between computers and physical storage units.

Computer 2000 may store data on mass storage device 2028 by transforming the physical state of the physical storage units to reflect the information being stored. The specific transformation of a physical state may depend on various factors and on different implementations of this description. Examples of such factors may include, but are not limited to, the technology used to implement the physical storage units and whether mass storage device 2028 is characterized as primary or secondary storage and the like.

For example, computer 2000 may store information to mass storage device 2028 by issuing instructions through storage controller 2024 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. Computer 2000 may further read information from mass storage device 2028 by detecting the physical states or characteristics of one or more particular locations within the physical storage units.

In addition to mass storage device 2028 described above, computer 2000 may have access to other computer-readable storage media to store and retrieve information, such as program modules, data structures, or other data. It should be appreciated by those skilled in the art that computer-readable storage media can be any available media that provides for the storage of non-transitory data and that may be accessed by computer 2000.

By way of example and not limitation, computer-readable storage media may include volatile and non-volatile, transitory computer-readable storage media and non-transitory computer-readable storage media, removable and non-removable media implemented in any method or technology. Computer-readable storage media includes, but is not limited to, RAM, ROM, erasable programmable ROM (EPROM), electrically erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage, other magnetic storage devices, or any other medium that can be used to store the desired information in a non-transitory fashion.

Mass storage device 2028 may store an operating system utilized to control the operation of the computer 2000. According to one embodiment, the operating system comprises a version of the LINUX operating system. According to another embodiment, the operating system comprises a version of the WINDOWS SERVER operating system from the MICROSOFT Corporation. According to further embodiments, the operating system may comprise a version of the UNIX operating system. It should be appreciated that other operating systems may also be utilized. Mass storage device 2028 may store other system or application programs and data utilized by computer 2000, such as management component 2010 and/or the other software components described above.

Mass storage device 2028 or other computer-readable storage media may also be encoded with computer-executable instructions, which, when loaded into computer 2000, transforms the computer from a general-purpose computing system into a special-purpose computer capable of implementing the embodiments described herein. These computer-executable instructions transform computer 2000 by specifying how CPUs 2004 transition between states, as described above. Computer 2000 may have access to computer-readable storage media storing computer-executable instructions, which, when executed by computer 2000, may perform operating procedures described above in connection with FIGS. 1-5.

Computer 2000 may also include an input/output controller 2032 for receiving and processing input from a number of input devices, such as a keyboard, a mouse, a touchpad, a touch screen, an electronic stylus, or other type of input device. Similarly, input/output controller 2032 may provide output to a display, such as a computer monitor, a flat-panel display, a digital projector, a printer, a plotter, or other type of output device. It will be appreciated that computer 2000 may not include all of the components shown in FIG. 8, may include other components that are not explicitly shown in FIG. 8, or may utilize an architecture completely different than that shown in FIG. 8.

As described herein, a computing node may be a physical computing node, such as computer 2000 of FIG. 8. A computing node may also be a virtual computing node, such as a virtual machine instance, or a session hosted by a physical computing node, where the computing node is configured to host one or more sessions concurrently.

It should be appreciated that the subject matter presented herein may be implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

Networks established by or on behalf of an entity, such as a company or organization, to provide one or more services (such as various types of cloud-based computing or storage) accessible via the Internet and/or other networks to a distributed set of clients may be termed provider networks. Such a provider network may include one or more data centers hosting various resource pools, such as collections of physical and/or virtualized computer servers, storage devices, networking equipment, and the like, that may be used to implement and distribute the infrastructure and services offered by the provider network. The resources may in some embodiments be offered to clients in units called "instances," such as virtual or physical compute instances or storage instances. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices, and the like. In some embodiments a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general purpose or special purpose operating systems, platforms that support various interpreted or compiled programming languages, such as Ruby, Perl, Python, C, C++, and the like or high-performance computing platforms) suitable for the applications. This may be done without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage, and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems (OS) and/or hypervisors and with various installed software applications, runtimes, and the like. Instances may further be available in specific availability zones, representing a data center or other geographic location of the underlying computing hardware, for example.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations, inexpensive and low latency network connectivity may be provided between resource instances that reside within the same geographical region (and network transmissions between resources of the same availability zone may be even faster).

The provider network may make instances available "on-demand," allowing a customer to select a number of instances of a specific type and configuration (e.g. size, platform, tenancy, availability zone, and the like) and quickly launch the instances for deployment. On-demand instances may further be added or removed as needed, either manually or automatically through auto scaling, as demand for or capacity requirements changes over time. The customer may incur ongoing usage costs related to their on-demand instances, based on the number of hours of operation and/or the actual resources utilized, for example.

The computing resource provider may also make reserved instances available to the customer. Reserved instances may provide the customer with the ability to reserve a number of a specific type and configuration of instances for a fixed term, such as one year or three years, for a low, upfront cost in exchange for reduced hourly or other usage costs, for example, if and when the instances are launched. This may allow the customer to defer costs related to scaling up the deployed application in response to increase in demand, while ensuring that the right resources will be available when needed. While reserved instances provide customers with reliable, stand-by capacity for scaling of their application, purchasing reserved instances may also lock the customer into a specific number, type, and/or configuration of computing resource in a specific availability zone for a longer period than desired. If the technical architecture or needs of the application change, the customer may not be able to realize a return on the customer's investment in the reserved instances.

Operators of such provider networks may in some instances implement a flexible set of resource reservation, control, and access interfaces for their clients. For example, a resource manager of the provider network may implement a programmatic resource reservation interface (e.g., via a web site or a set of web pages) that allows clients to learn about, select, purchase access to and/or reserve resource instances. In some embodiments discussed below where an entity, such as a resource manager or a pricing optimizer, is described as implementing one or more programmatic interfaces, such as a web page or an API, an interface manager subcomponent of that entity may be responsible for the interface-related functionality. In many embodiments equivalent interface-related functionality may be implemented by a separate or standalone interface manager, external to the resource manager and the pricing optimizer Such an interface may include capabilities to allow browsing of a resource catalog and details and specifications of the different types or sizes of resources supported and the different reservation types or modes supported, pricing models, and so on.

The provider network may support several different purchasing modes (which may also be referred to herein as reservation modes) corresponding to some of the instance types described above. For example, the provider network may support long-term reservations, on-demand resource allocations, or spot-price-based resource allocations. Using the long-term reservation mode, a client may make a low, one-time, upfront payment for a resource instance, reserve it for a specified duration, such as a one- or three-year term, and pay a low hourly rate for the instance; the client would be assured of having the reserved instance available for the term of the reservation. Using the on-demand mode, a client could pay for capacity by the hour (or some appropriate time unit), without any long-term commitments or upfront payments. In the spot-price mode, a client could specify the maximum price per unit of time that it is willing to pay for a particular type of resource, and if the client's maximum price exceeded a dynamic spot price determined at least in part by supply and demand, then that type of resource would be provided to the client. In some embodiments, dynamically resizable pools of resource instances may be set aside for the different reservation types or modes—e.g., long-term reserved instances may be allocated from one pool, on-demand instances from another, and so on. During periods when the supply of the requested resource type exceeded the demand, the spot price may become significantly lower than the price for the on-demand mode. In some implementations, if the spot price increases beyond the maximum bid specified by a client, a resource allocation may be interrupted—i.e., a resource instance that was previously allocated to the client may be reclaimed by the resource manager and may be allocated to some other client that is willing to pay a higher price. Other purchasing modes or combinations of modes may be implemented by the resource manager in some embodiments.

It will be appreciated that while illustrative embodiments have been disclosed, the scope of potential embodiments is not limited to those explicitly described. For example, while the concepts are described with reference to requests received to perform particular types of functions or commands, the envisioned embodiments extend to processing involving any and all types of functions and commands. Similarly, while the concepts are described with reference to particular protocols and formats, the envisioned embodiments extend to processing involving any and all types of protocols and formats.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system, comprising:
   a plurality of computing systems in communication with each other; and one or more non-transitory computer-readable storage media having stored thereon instructions that, upon execution on at least one of the plurality of computing systems, cause the performance of operations comprising:
   at a first computing system having control of a data object, transmitting for receipt at a plurality of computing systems that interact with the data object a message to suspend transmitting requests relating to the data object;
   at the first computing system having control of the data object, queueing requests relating to the data object received at the first computing system after transmitting the message to suspend transmitting requests relating to the data object;
   at the plurality of computing systems that interact with the data object, in response to receiving the message requesting to suspend transmitting requests relating to the data object, suspending transmitting requests relating to the data object, identifying that a transfer of control of the data object is pending, and transmitting an acknowledgment message;
   at the first computing system, confirming receipt of an acknowledgment message from each of the plurality of computing systems;
   at the first computing system, in response to confirming receipt of an acknowledgment message from each of the plurality of computing systems, transmitting a message for a second computing system to take control of the data object and transmitting to the second computing system requests relating to the data object that were queued at the first computing system;
   at the second computing system, receiving the message to take control of the data object and receiving requests relating to the data object that were queued at the first computing system;
   at the second computing system, in response to receiving the message to take control of the data object, assuming control of the data object and transmitting a message indicating the second computing system has control of the data object;
   at the plurality of computing systems that interact with the data object, in response to the message indicating the second computing system has control of the data object, resuming transmitting of requests relating to the data object;
   at the second computing system, receiving requests relating to the data object from the plurality of computing systems that interact with the data object; and
   at the second computing system, processing the requests received from the first computing system prior to processing requests received from the plurality of computing systems.

2. The system of claim 1, wherein processing the requests received from the first computing system prior to processing requests received from the plurality of computing system comprises processing request from the first computing system upon receipt from the first computing system.

3. The system of claim 1, the operations further comprising:
   at the first computing system, in response to the message indicating the second computing system has control of the data object, transmitting to the second computing system a message indicating migration of ownership of the data object is complete.

4. The system of claim 3, wherein processing the requests received from the first computing system prior to processing requests received from the plurality of computing system comprises processing requests received from the first computing system upon receipt from the first computing system and processing requests received from the plurality of computing systems after receiving the message indicating migration of ownership of the data object is complete.

5. A method, comprising:
   at a first computing system having authority to modify a data object, transmitting to a second computing system that interacts with the data object a message to suspend transmitting requests relating to the data object;
   at the first computing system, queueing requests relating to the data object received at the first computing system after transmitting the message to suspend transmitting requests relating to the data object;
   at the second computing system that interacts with the data object suspending transmitting requests relating to the data object;
   at the first computing system transmitting a message for a third computing system to take authority to modify the data object and transmitting to the third computing system requests relating to the data object that were queued at the first computing system;
   at the third computing system, receiving the message to take authority to modify the data object and receiving requests relating to the data object that were queued at the first computing system;
   at the third computing system assuming authority to modify the data object; and
   at the second computing system that interacts with the data object transmitting to the third computing system requests relating to the data object.

6. The method of claim 5, further comprising:
   at the third computing system, processing the requests received from the first computing system prior to processing requests received from the second computing system.

7. The method of claim 6, wherein processing the requests received from the first computing system prior to processing requests received from the second computing system comprises processing request from the first computing system upon receipt from the first computing system.

8. The method of claim 5, further comprising:
   at the first computing system, in response to the message indicating the third computing system has authority to modify the data object, transmitting to the third computing system a message indicating migration of authority to modify the data object is complete.

9. The method of claim 8, further comprising:
at the third computing system processing requests received from the first computing system upon receipt from the first computing system and processing requests received from the second computing system after receiving the message indicating migration of authority to modify the data object is complete.

10. The method of claim 5, wherein transmitting for receipt at a second computing system that interacts with the data object a message to suspend transmitting requests relating to the data object comprises transmitting a message to a plurality of computing systems that interact with the data object.

11. The method of claim 5, further comprising at the first computing system requesting data identifying computing systems that interact with the data object.

12. The method of claim 5, wherein at the first computing system having authority to modify the data object, queuing requests relating to the data item received at the first computing system comprises recording requests received at the first computing system after the first computing system transmits the message to suspend transmitting requests relating to the data object.

13. The method of claim 5, wherein transmitting for receipt at a second computing system that interacts with the data object a message to suspend transmitting requests relating to the data object comprises transmitting information identifying the first computing system and information identifying the third computing system.

14. The method of claim 5, wherein at the second computing system that interacts with the data object suspending transmitting requests relating to the data object comprises queuing requests relating to the data object.

15. The method of claim 5, wherein the data object comprises data associated with a person, place, or thing in a virtual game.

16. One or more non-transitory computer-readable storage media having stored thereon instructions that, upon execution on at least one computing node, cause the at least one computing node to perform operations comprising:
at a first computing node designated as the owner of a data object, transmitting to a second computing node that interacts with the data object a message to suspend transmitting requests relating to the data object;
at the first computing node, queuing requests relating to the data item received at the first computing node;
at the first computing node, receiving an acknowledgment from the second computing node;
at the first computing node transmitting a message for a third computing node to take ownership of the data object and transmitting to the third computing node requests relating to the data object that were queued at the first computing node;
at the third computing node assuming ownership of the data object and transmitting a message indicating the third computing node is the owner of the data object.

17. The one or more non-transitory computer-readable storage media of claim 16, the operations further comprising:
at the second computing node, in response to receiving the message requesting to suspend transmitting requests relating to the data object, suspending transmitting requests relating to the data object and transmitting an acknowledgment message;
at the second computing node, in response to the message indicating the third computing node is the owner of the data object, transmitting requests relating to the data object.

18. The one or more non-transitory computer-readable storage media of claim 16, the operations further comprising:
at the first computing node transmitting to the third computing node a message indicating reassignment of ownership of the data object is complete; and
at the third computing node, receiving from the first computing node the message indicating reassignment of ownership of the data object is complete.

19. The one or more non-transitory computer-readable storage media of claim 18, the operations further comprising:
at the third computing node processing requests received from the first computing node upon receipt from the first computing node and processing requests received from the second computing node after receiving the message indicating migration of authority to modify the data object is complete.

20. The one or more non-transitory computer-readable storage media of claim 16, wherein transmitting to a second computing node that interacts with the data object a message to suspend transmitting requests relating to the data object comprises transmitting a message identifying ownership of the data object is being reassigned from the first computing node to the third computing node.

* * * * *